(12) United States Patent
Hanson

(10) Patent No.: US 8,142,100 B2
(45) Date of Patent: Mar. 27, 2012

(54) ANIMAL CROSSING WARNING ZONE AND METHOD OF APPLYING IT TO A ROADWAY

(76) Inventor: Harold Ralph Hanson, Appleton, WI (US)

( * ) Notice: Subject to any disclaimer, the term of this patent is extended or adjusted under 35 U.S.C. 154(b) by 27 days.

(21) Appl. No.: 12/804,164

(22) Filed: Jul. 14, 2010

(65) Prior Publication Data

US 2011/0013981 A1    Jan. 20, 2011

Related U.S. Application Data

(60) Provisional application No. 61/270,832, filed on Jul. 14, 2009.

(51) Int. Cl.
*E01F 9/04* (2006.01)
(52) U.S. Cl. .......................... 404/12; 116/63 R
(58) Field of Classification Search ................ 404/9, 12; 116/63 R; 119/174
See application file for complete search history.

(56) References Cited

U.S. PATENT DOCUMENTS

| | | | |
|---|---|---|---|
| 1,732,869 A | 10/1929 | Wambach | |
| 3,188,927 A | 6/1965 | Woods | |
| 4,250,646 A | 2/1981 | Trachtenberg | |
| 4,687,369 A * | 8/1987 | McDonald | 404/12 |
| 4,908,616 A * | 3/1990 | Walker | 340/929 |
| 5,277,516 A * | 1/1994 | Strieter | 404/14 |
| 5,320,446 A * | 6/1994 | Strieter | 404/14 |
| 5,761,060 A * | 6/1998 | Drew | 700/17 |
| 5,873,674 A * | 2/1999 | Hohl | 404/9 |
| 5,939,987 A | 8/1999 | Cram | |
| 6,259,374 B1 * | 7/2001 | Kisner et al. | 340/905 |
| 6,413,010 B2 * | 7/2002 | Coleman | 404/14 |
| 6,683,540 B1 * | 1/2004 | Harrison | 340/944 |
| 6,719,467 B2 | 4/2004 | Hess et al. | |
| 7,113,098 B1 | 9/2006 | Hayes | |
| 2001/0046413 A1 | 11/2001 | Moorhead | |
| 2005/0255273 A1 | 11/2005 | Gorman | |
| 2009/0047068 A1 * | 2/2009 | Bucalo | 404/9 |

FOREIGN PATENT DOCUMENTS

| | | |
|---|---|---|
| DE | 20018780 | 4/2001 |
| WO | 9404757 | 3/1994 |

OTHER PUBLICATIONS

WEAU 13 News, Light Beams Test to Scare Deer Near Road, internet article, www.weau.com/home/headlines/48605547.html, article posted Jun. 19, 2009, article printed May 21, 2010, Minnesota.
KOHD ABC News, Oregon's First Deer Crossings, Internet article, www.kohd.com/news/local/147745, article posted Nov. 4, 2009, article printed Jun. 9, 2010, Oregon.
Jeff Bailey, The Bambi Factor, How did the deer cross the road? In Montana, it has its own bridges and tunnels, Michelle Crouch, What We Do While We Drive, You think texting while driving is bad? Wait until you hear what America's truckers have seen, readersdigest.com, The Risks, Apr. 2010 issue, pp. 132-135.
Lisa Goff, The Makeover of Route 21, Once deadly, it's now the "Cadillac of Highways", Fran Lostys, What If . . . ?, Fran Lostys, Other Bright Ideas for Saving Lives, readersdigest.com, The Recommendations, Apr. 2010 issue, pp. 136-139.

* cited by examiner

*Primary Examiner* — Gary S Hartmann
(74) *Attorney, Agent, or Firm* — Thomas J. Connelly; Wilhelm Law, S.C.

(57) ABSTRACT

This invention pertains to an animal crossing warning zone wherein a motorist is alerted that he or she is entering, passing through, and then exiting a section of roadway where wild animals, such as whitetail deer, have a tendency to cross the road. A method of applying the animal crossing warning zone onto, into or out of an upper surface of a roadway is also disclosed.

20 Claims, 7 Drawing Sheets

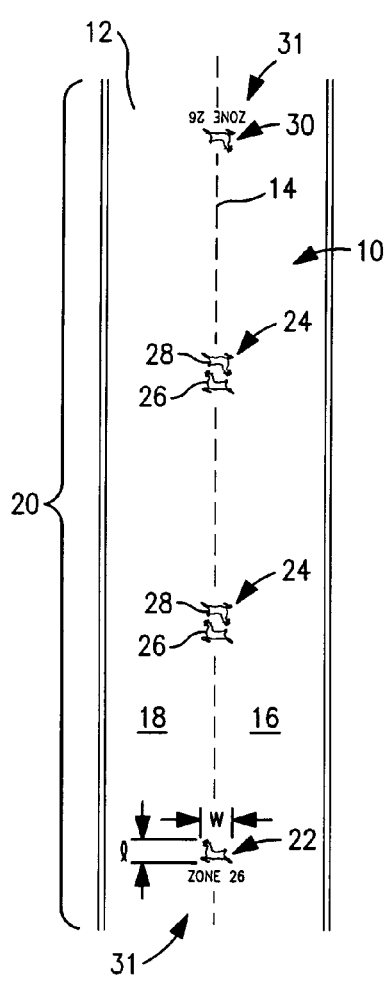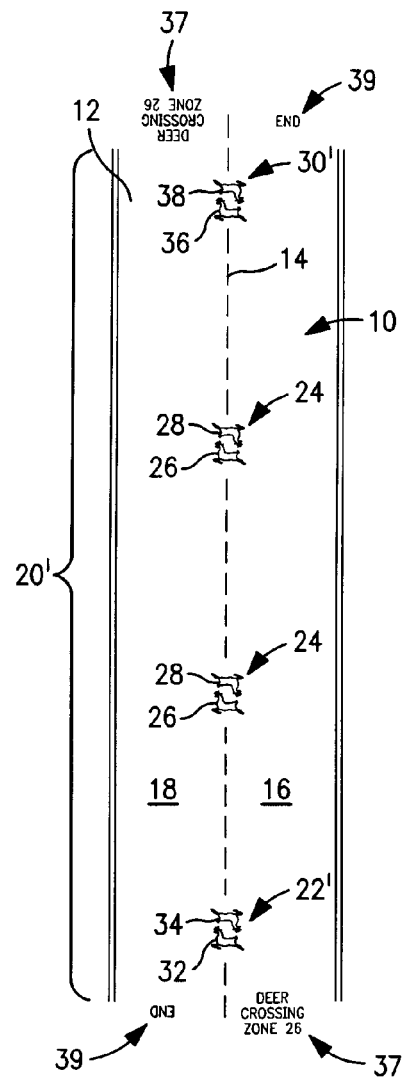
FIG. 1  FIG. 2

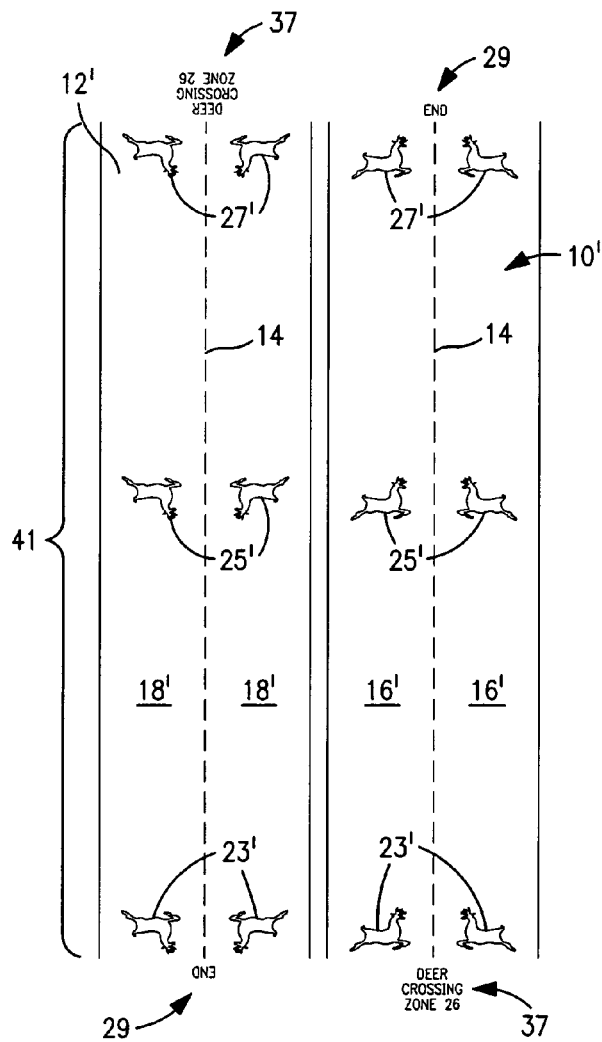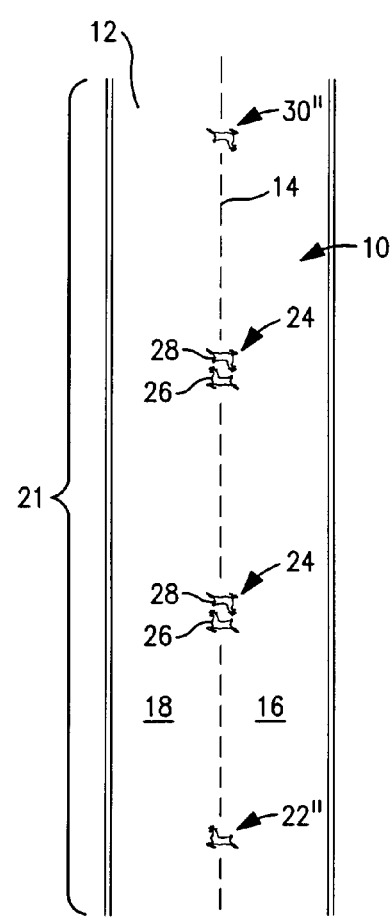
FIG. 3C   FIG. 4

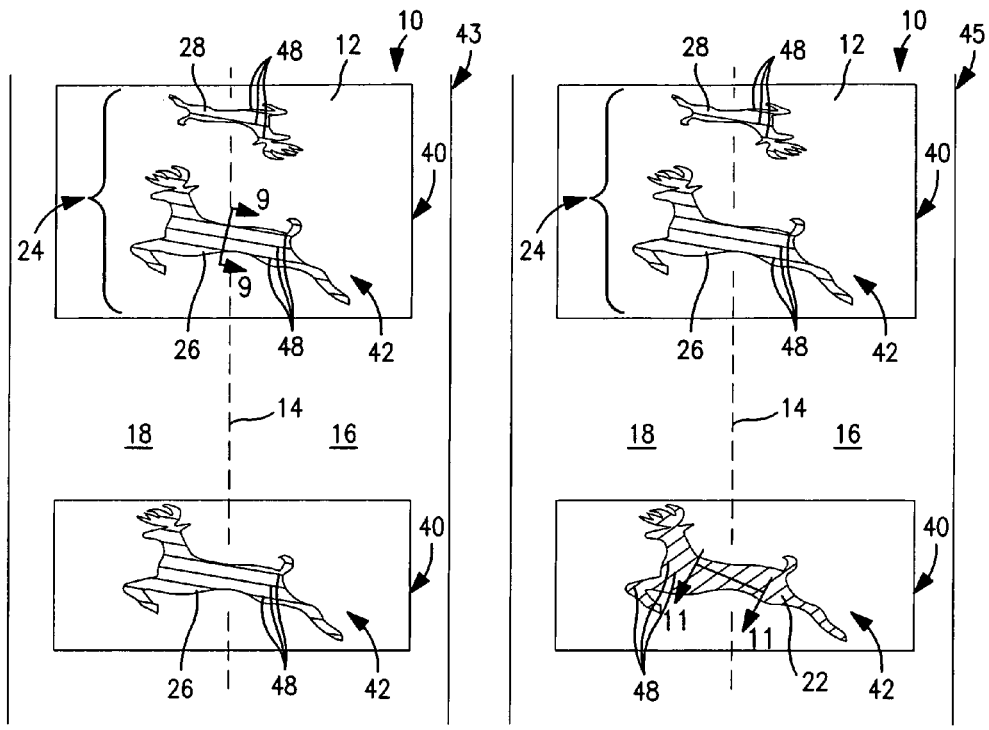
FIG. 8          FIG. 10
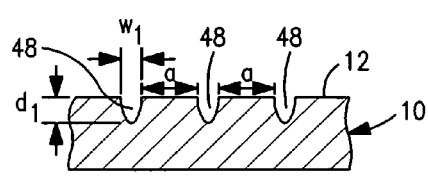   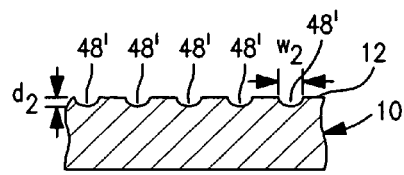
FIG. 9          FIG. 11

ANIMAL CROSSING WARNING ZONE AND METHOD OF APPLYING IT TO A ROADWAY

CROSS REFERENCE TO RELATED APPLICATION

This patent application is a regular patent application claiming priority to U.S. Provisional patent application 61/270,832, filed Jul. 14, 2009.

FIELD OF THE INVENTION

This invention relates to an animal crossing warning zone and method of applying it to a roadway. More specifically, this invention relates to a deer crossing warning zone applied to the upper surface of a roadway to reduce vehicle-deer accidents.

BACKGROUND

It has been well documented that a large number of vehicle-animal accidents, especially car-deer accidents, occur in selected areas. Many of these selected areas are in rural locations. The accidents occur when motorized vehicles, such as cars, trucks, buses, motorcycles, etc. hit or strike large animals that are attempting to cross a road. Such accidents can occur at any time but primarily seem to occur during periods of low light, such as either early in the morning, in the evening or after dark. The animals are mostly wild animals such as whitetail deer, mule deer, antelope, buffalo, etc. However, sometimes the animals are domestic animals, such as cattle, horses, sheep, pigs, etc.

Many government departments and agencies try to mark certain roads, roadways and highways by using yellow warning signs mounted on vertical posts. These warning signs are positioned off the shoulder of the road at eye level but are sometimes difficult for an approaching motorist to see. In many counties, there are known locations where every year a large number of vehicle-animal accidents occur. Automobile insurance companies have been vigilant in trying to arrive at a better solution to reduce the number of such vehicle-animal accidents. However, certain areas, because of the surrounding topography, the climate, lack of human population, adjacent farm land, proximity to forest land, etc., tend to support a healthy wild game population. It is known that wild animals tend to travel or migrate vast distances in search of food, water and mates during mating season.

The states of Pennsylvania, Michigan, Wisconsin, Minnesota, New York, Virginia, Texas and Florida have relatively large deer populations. Some of our western states, like Wyoming, Colorado, Montana, Idaho and Utah have healthy mule deer, pronghorn, antelope, elk and moose herds. On certain public roads, roadways and highways that pass through such rural areas, government personnel, such as employees of the Department of Natural Resources (DNR) or elected public official from local towns, cities, municipalities, states, etc. have identified certain stretches of roads, roadway and highways where there is a high probability of animal crossing. Whitetail deer are the most prevalent wild animal and their path of travel can be erratic especially in the fall when the rut is on. Inclement weather conditions, such as fog, haze, rain, sleet, snowfall, etc. can also contribute to such accidents because they tend to diminish a motorist vision. Furthermore, many rural roads are relatively narrow with very little shoulder area, follow an undulating surface topography and/or have a number of tight curves, and all of these factors increase the likeliness of vehicle-animal accidents.

A number of solutions have been proposed to rectify this problem but such solutions have met with minimal success. The use of warning signs has proven futile. The use of audible alarms or flashing lights positioned in deer crossing zones appear reasonable but most have proven to be too expensive to implement. Tunnels constructed under the roadways have met with a fair amount of success in western states where herd migration occurs but again are too expensive to implement on a large scale for non-migrating wild animals. Lastly, noise devices which are suppose to emit a high frequency sound that only animals can hear, and which are designed to be mounted on the front bumper of a car or truck are almost worthless.

Now, a new and unique animal crossing warning zone and a method of applying it to the upper surface of a roadway have been invented which can reduce the number of vehicle-animal accidents, especially between cars and whitetail deer.

SUMMARY

Briefly, this invention relates to an animal crossing warning zone for a roadway. The animal can be a whitetail deer, a mule deer, an elk, a pronghorn, an antelope, a moose, a buffalo, sheep, cattle or any known large domestic or wild animal that has a tendency to cross a road, roadway or highway upon which vehicle traffic is common. The roadway has an upper surface with a centerline dividing the roadway into a right lane and a left lane. The animal crossing warning zone includes a first graphical icon applied to the upper surface of the roadway at one end of an animal crossing warning zone. The first graphical icon can be aligned with the centerline. The first graphical icon represents an animal running from right to left and right side up as viewed by an approaching motorist driving in the right lane whereby the approaching motorist in the right lane is alerted that he or she is entering an animal crossing warning zone. The first graphical icon also represents an animal running from left to right and upside down as viewed by an approaching motorist driving in the left lane whereby the approaching motorist in the left lane is alerted that he or she is exiting an animal crossing warning zone.

The animal crossing warning zone also includes one or more sets of graphical icons applied to the upper surface of the roadway within the animal crossing warning zone. Each set of graphical icons is located at a predetermined distance from the first graphical icon. Each set of graphical icons includes a first icon representing an animal running from right to left as viewed by an approaching motorist driving in the right lane. The second icon also represents an animal running from right to left as viewed by an approaching motorist driving in the left lane whereby an approaching motorist driving in either lane is alerted that he or she is passing through the animal crossing warning zone. The first and second icons can be aligned back-to-back or side-to-side.

The animal crossing warning zone further includes a second graphical icon applied to the upper surface of the roadway at an opposite end of the animal crossing warning zone. The second graphical icon can be aligned with the centerline. The second graphical icon represents an animal running from left to right and upside down as viewed by an approaching motorist driving in the right lane whereby the approaching motorist in the right lane is alerted that he or she is exiting the animal crossing warning zone. The second graphical icon also represents an animal running from right to left and right side up as viewed by an approaching motorist driving in the left lane whereby the approaching motorist in the left lane is alerted that he or she is entering an animal crossing warning zone.

In another embodiment of this invention, an animal crossing warning zone for a roadway is disclosed wherein the roadway has an upper surface with a centerline dividing the roadway into a right lane and a left land. The animal crossing warning zone includes a first set of graphical icons applied to the upper surface of the roadway and at one end thereof. The first set of graphical icons can be aligned with the centerline. The first set of graphical icons includes a first icon representing an animal running from right to left and right side up as viewed by an approaching motorist driving in the right lane, and a second icon representing an animal running from right to left and right side up as viewed by an approaching motorist driving in the left lane whereby an approaching motorist in either lane is alerted that he is entering an animal crossing warning zone.

The animal crossing warning zone also includes one or more second sets of graphical icons applied to the upper surface of the roadway within the animal crossing warning zone. Each of the second sets of graphical icons can be aligned with the centerline and is located at a predetermined distance from the first graphical icon. Each of second sets of graphical icons includes a first icon representing an animal running from right to left and right side up as viewed by an approaching motorist driving in the right lane, and a second icon representing an animal running from right to left and right side up as viewed by an approaching motorist driving in the left lane whereby an approaching motorist in either lane is alerted that he or she is passing through the animal crossing warning zone.

The animal crossing warning zone further includes a third set of graphical icons applied to the upper surface of the roadway at an opposite end thereof. The third set of graphical icons can be aligned with the centerline. The third set of graphical icons includes a first icon representing an animal running from left to right and right side up as viewed by an approaching motorist driving in the right lane, and a second icon representing an animal running from left to right and upside down as viewed by an approaching motorist driving in the right lane whereby an approaching motorist in the right lane is alerted that he or she is exiting the animal crossing warning zone. The word "END" is also applied, painted or sprayed in the right lane just beyond the third set of graphical icons to inform the approaching motorist that he or she has exited the animal crossing warning zone.

In still another embodiment, a method of applying an animal crossing warning zone to a roadway is disclosed. The roadway has an upper surface with a centerline dividing the roadway into a right lane and a left land. The method includes the steps of cleaning at least first, second and third distinct and spaced apart designated areas on the upper surface of the roadway. The at least first, second and third designated areas can be aligned with the centerline. The first designated area is located at one end of the animal crossing warning zone, the second designated area is located within the animal crossing warning zone, and the third designated area is located at an opposite end of the animal crossing warning zone as viewed by an approaching motorist driving in the right lane.

The method also includes applying a first graphical icon in the first designated area. The first graphical icon representing an animal running from right to left and right side up as viewed by an approaching motorist driving in the right lane whereby the approaching motorist in the right lane is alerted that he is entering an animal crossing warning zone. The first graphical icon also represents an animal running from right to left and right side up as viewed by an approaching motorist driving in the left lane whereby the approaching motorist in the left lane is alerted that he or she is exiting the animal crossing warning zone.

The method further includes applying a set of back-to-back graphical icons in the second designated area. The set of back-to-back graphical icons include a first icon representing an animal running from right to left and right side up as viewed by an approaching motorist driving in the right lane, and a second icon representing an animal running from right to left and right side up as viewed by an approaching motorist driving in the left lane whereby an approaching motorist in either lane is alerted that he is passing through the animal crossing warning zone.

Lastly, the method includes applying a second graphical icon in the third designated area. The second graphical icon representing an animal running from left to right and upside down as viewed by an approaching motorist driving in the right lane whereby the approaching motorist driving in the right lane is alerted that he or she is exiting the animal crossing warning zone, and the second graphical icon also representing an animal running from right to left and right side up as viewed by an approaching motorist driving in the left lane whereby the approaching motorist driving in the left lane is alerted that he or she is entering an animal crossing warning zone.

In a further embodiment of this invention, an animal crossing warning zone for a roadway having an upper surface with a centerline dividing said roadway into a right lane and a left lane is disclosed. The animal crossing warning zone includes a first graphical icon applied to the upper surface of the roadway at one end of an animal crossing warning zone. The first graphical icon represents an animal running from right to left and right side up as viewed by an approaching motorist driving in the right lane whereby the approaching motorist in the right lane is alerted that he is entering an animal crossing warning zone.

The animal crossing warning zone also includes a second graphical icon applied to the upper surface of the roadway within the animal crossing warning zone. The second graphical icon is located at a predetermined distance from the first graphical icon. The second graphical icon representing an animal running from right to left and right side up as viewed by an approaching motorist driving in the right lane.

The animal crossing warning zone further includes a third graphical icon applied to the upper surface of the roadway at an opposite end of the animal crossing warning zone. The third graphical icon representing an animal running from left to right as viewed by an approaching motorist driving in the right lane and an identification reference applied to the upper surface of the roadway adjacent to the third graphical icon. Whereby the approaching motorist in the right lane is alerted that he or she is exiting the animal crossing warning zone.

The general object of this invention is to provide an animal crossing warning zone which will reduce vehicle-animal accidents. A more specific object of this invention is to provide a safe animal crossing warning zone that will alert motorist that they are entering, passing through and exiting the zone regardless of the length of the zone.

Another object of this invention is to provide an animal crossing warning zone which is easy and economical to apply to a roadway and maintain, and which will prove to be safer for motorist to pass through.

Still another object of this invention is to provide an animal crossing warning zone which provides both a visual and an audible alert to an approaching motorist.

Still further, an object of this invention is to provide an animal crossing warning zone which provides an audible alert to nearby animals that a vehicle is approaching.

Other objects and advantage of the present invention will become more apparent to those skilled in the art in view of the following description and the accompanying drawings.

BRIEF DESCRIPTION OF THE DRAWINGS

FIG. 1 is a top view of a roadway having an animal crossing warning zone applied thereto which includes a pattern of graphical icons along with a reference to the roadway number.

FIG. 2 is a top view of a roadway having an alternative animal crossing warning zone applied thereto which includes one or more back-to-back graphical icons spaced over the length of the zone.

FIG. 3C is a top view of a four lane roadway having an animal crossing warning zone applied thereto which includes a pattern of graphical icons aligned within each lane and each pair of icons facing one another.

FIG. 4 is a top view of a roadway having still another animal crossing warning zone applied thereto which includes one or more back-to-back graphical icons spaced within the zone and having a single graphical icon of a larger size at the beginning and end of the zone.

FIG. 8 is a top view of a first graphical icon and a set of back-to-back graphical icons, each icon containing a plurality of grooves which emit an audible sound as a tire of a vehicle passes over them.

FIG. 9 is a cross-sectional view taken along line 9-9 of FIG. 8 showing the spacing and depths of each groove.

FIG. 10 is a top view of a first graphical icon and a set of back-to-back graphical icons, each icon containing a plurality of grooves which are aligned at a different angle to the centerline such that the plurality of grooves formed in the first graphical icon will emit a different audible sound than the plurality of grooves formed in the set of graphical icons as a tire of a vehicle passes over them.

FIG. 11 is a cross-sectional view taken along line 11-11 of FIG. 10 showing the spacing and depths of each groove.

FIG. 14 is a flow diagram depicting a method of applying the animal crossing warning zone to a roadway.

DETAILED DESCRIPTION OF THE INVENTION

Figures 3, 3A:
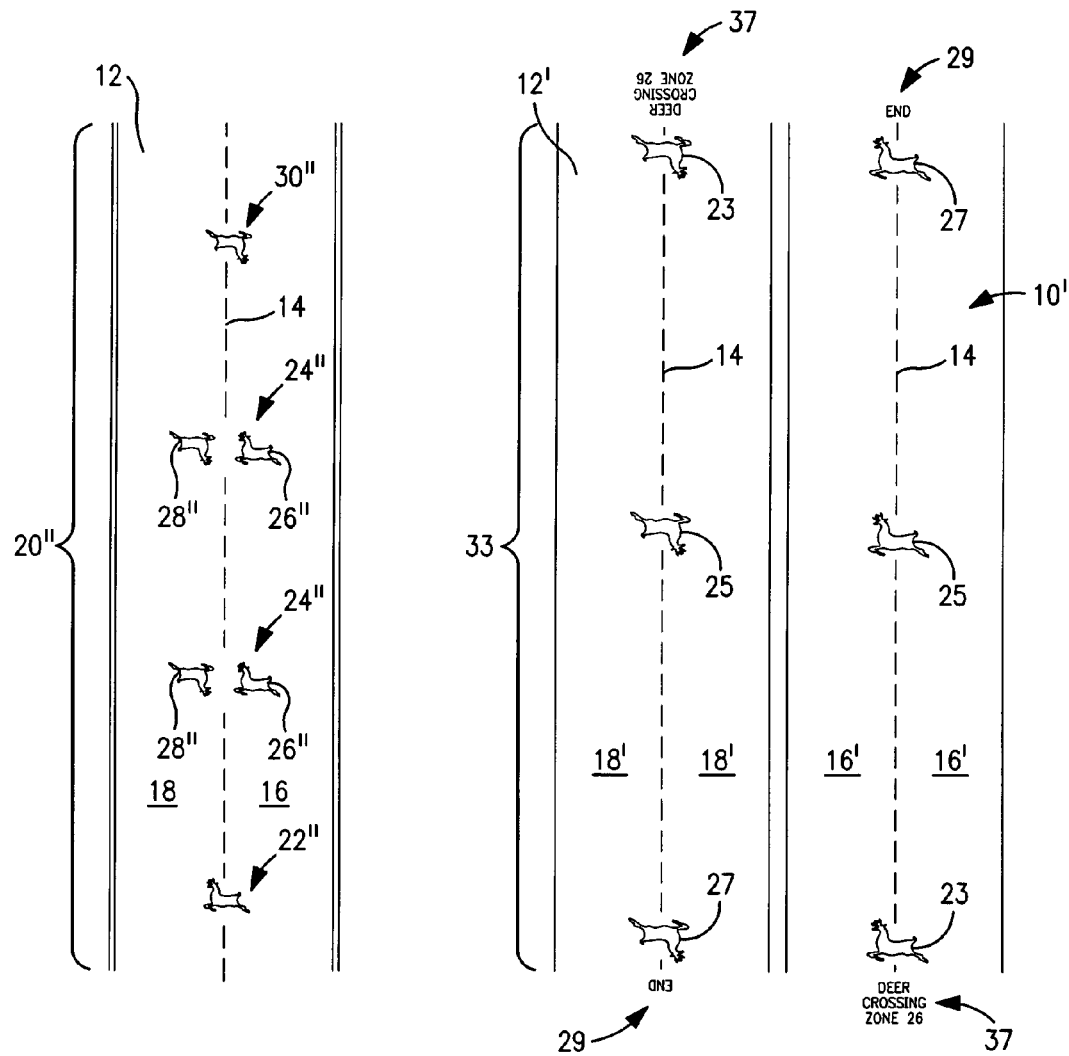
FIG. 3 is a top view of a roadway having still another animal crossing warning zone applied thereto which includes one or more side-to-side graphical icons spaced within the zone.
FIG. 3A is a top view of a four lane roadway having an animal crossing warning zone applied thereto which includes a pattern of graphical icons aligned along the centerline.

Referring to FIG. 1, a roadway 10 is shown having an upper surface 12. By roadway it is meant a road or highway over which vehicles travel. The roadway can be constructed from various pavement materials known to those skilled in the art. Common materials used to build roads, roadways, highways, etc. include asphalt; asphalt mixed with crushed stone or gravel; tar-based compositions; concrete; concrete-based compositions; rubber-based material; wood; bricks; stones; etc. By "asphalt" it is meant a brownish-black solid or semi-solid mixture of bitumens obtained from native deposits or as a petroleum byproduct. By "concrete" it is meant a hard, strong construction material consisting of sand, conglomerate gravel, pebbles, broken stone or slag in a mortar or cement matrix.

The roadway 10 has a centerline 14 applied thereon such as by painting, stenciling, taping or otherwise being constructed thereon. Typically, the centerline 14 is painted or taped on the upper surface 12 of the roadway 10 using an outdoor paint or an adhesively treated tap specifically designed for application to an asphalt or concrete surface. Throughout the world, the standard colors for a centerline 14 are white or yellow. The centerline 14 can be a single continuous line, a line of intermittent dashes or two parallel continuous lines. The different universal variations of centerlines 14 are dictated by the governments to indication no passing zones, passing zones, etc.

The centerline 14 divides the roadway 10 into a right lane 16 and a left lane 18. It should be understood that the roadway 10 may have a total of two or more lanes. For example, a two lane roadway may be expanded to three lanes as it approaches a cross road to provide for a turning lane. In this case, the roadway may have two right lanes and one left lane for a given distance. The roadway 10 can also consist of two or more right lanes and two or more left lanes. The two or more right lanes can be separated or divided from the two or more left lanes by a medium, if desired.

Still referring to FIG. 1, an animal crossing warning zone 20 is applied onto and/or into the upper surface 12 of the roadway 10. The animal crossing warning zone 20 is meant to reduce vehicle-animal collisions, decrease fatalities, limit injuries and reduce property damage. The animal crossing warning zone 20 includes a pattern of graphical icons intermittently arranged over the length of the zone. The length of an animal crossing warning zone 20 can vary. Some animal crossing warning zone 20 can be as short as 0.25 miles while others can be several miles long. Most animal crossing warning zone 20 extend over a stretch of roadway 10 of between about 0.5 miles to about 2 miles.

It should be noted that all animal crossing warning zone 20 should be marked as "No Passing Zones". This means that two parallel, solid continuous yellow lines should be painted or taped to the upper surface 12 of the roadway 10 to form the centerline 14. The two parallel and continuous yellow lines will alert all approaching motorists that they are entering into a "No Passing Zone". However, the animal crossing warning zone 20 can be a passing zone, if desired.

The animal crossing warning zone 20 is an evolutionary change from the original deer crossing signs which the State of Wisconsin, as well as other states, and Canada started to use in the 1950's and 1960's. The original deer crossing signs, which are still in use today, include yellow roadside signs each containing the silhouette of a running or leaping deer. The deer is black in color. Each deer crossing signs is mounted on a vertical post located to the right side of the roadway such that the sign appeared at eye level to approaching motorists. These deer crossing signs are positioned along stretches of roadway where frequent vehicle-deer accidents occurred.

The University of Wisconsin-Madison conducted a study that concluded that a majority of vehicle-deer accidents in the state of Wisconsin still occur along these stretches of roadway where the deer crossing signs appear. However, the present deer crossing signs are ineffective at preventing vehicle-deer accidents.

Still referring to FIG. 1, the animal crossing warning zone 20 can be painted, taped, stenciled, stamped, sprayed, rolled, brushed, or otherwise applied onto the upper surface 12 of the roadway 10. In addition, a portion or all of the animal crossing warning zone 20 can be formed into the upper surface 12 of the roadway 10 such as by forming a plurality of grooves, or by forming one or more cavities, marks, holes, indentations, channels, etc. which extend below or into the upper surface 12 of the roadway 10. Alternatively, a portion or all of the animal crossing warning zone 20 can consist of one or more protuberances, bumps, humps, bulges, swellings, etc. that extend upward or out of the upper surface 12 of the roadway 10. Those skilled in the art will know of equipment and tools that can be used to accomplish such structural features.

The animal crossing warning zone 20 includes a pattern of graphical icons positioned on, in or which extend out of the roadway 10. In addition, the animal crossing warning zone 20 can also include alphanumeric references, numeric references, letters, words, numbers, symbols, etc. By "alphanumeric reference" it is meant markings consisting of or utilizing letters, words and numbers and usually punctuation marks, mathematical symbols, and other conventional symbols.

The animal crossing warning zone 20 includes a first graphical icon 22 applied onto and/or into the upper surface 12 of the roadway 10 at one end of the animal crossing warning zone 20. For example, the first graphical icon 22 can appear at the beginning or start of an animal crossing warning zone 20. The first graphical icon 22 can be a single icon or two or more icons. The first graphical icon 22 can appear in any desired color. Since the upper surface 12 of the roadway 10 is usually of a dark color, such as gray, tan, black, brown, etc., the first graphical icon 22 should be of a contrasting color to make it more visible to an approaching motorist. White, yellow, orange, blaze orange and chartreuse are some colors that appear to be visible to approaching motorist even during periods of low light. Desirably, the first graphical icon 22 will be white or blaze orange in color. When the first graphical icon 22 is painted, taped or sprayed onto the roadway 10, it should exhibit a high degree of visibility. In addition, the color should exhibit a contrasting density with the upper surface 12 of the roadway 10.

In FIG. 1, the first graphical icon 22 is positioned at the start of the animal crossing warning zone 20 as it appears to an approaching motorist in the right lane 16. By "motorist" it is meant to include an operator of a vehicle, such as a car, a truck, a van, a bus, a motorcycle, a scooter or any other known vehicle that can travel along the roadway 10. The first graphical icon 22 is aligned with the centerline 14. Desirably, the first graphical icon 22 will be bifurcated by the centerline 14 for a two lane roadway 10. However, the first graphical icon 22 can be offset from the centerline 14, if desired. For example, the first graphical icon 22 can totally appear in the right lane 16 or in the left lane 18. However, by applying the first graphical icon 22 along the centerline 14 it may be easier for the approaching motorist to visibly see it and, depending upon its overall size, will be exposed to limited wear by having one or more of the tires on a vehicle ride over it. By being subjected to less wear, the first graphical icon 22 will be able to be used for longer periods of time before it has to be repainted, be stenciled again, be taped again, etc. The shape, size and overall configuration of the first graphical icon 22 can vary. Desirably, the first graphical icon 22 will represent an animal that an approaching motorist is most likely to see crossing the roadway 10. For example, in FIG. 1, the first graphical icon 22 represents a running or leaping whitetail deer. The first graphical icon 22 can be a silhouette of a whitetail deer. The silhouette does not have to identify every detail on whitetail deer exactly. For example, the genital area of the deer can be eliminated. Desirably, the first graphical icon 22 will be proportional in size and configuration to an actual whitetail deer. However, it does not have to be. The artist can take liberties where necessary as long as the overall configuration is interpreted and recognized by most everyone that the first graphical icon 22 does represent the animal most likely encountered by an approaching motorist.

In FIG. 1, the first graphical icon 22 represents an animal running from right to left as viewed by an approaching motorist driving in the right lane 16. Alternatively, the first graphical icon 22 can represent an animal running from right to left as viewed by an approaching motorist. In addition, the first graphical icon 22 can be right side up as viewed by an approaching motorist. The approaching motorist in the right lane 16 will be alerted upon visually seeing the first graphical icon 22 that he or she is entering an animal crossing warning zone. For a motorist travelling in the left lane 18, the first graphical icon 22 will also represent an animal (a white tail deer) running from left to right. The motorist in the left lane is thereby alerted that he or she is exiting the animal crossing warning zone 20. If the first graphical icon 22 is positioned right side up to the approaching motorist in the right lane then this same graphical icon 22 will appear upside down to an approaching motorist in the left lane.

The first graphical icon 22 has a height h and a width w. The height h is measured parallel to the centerline 14 and the width is measured perpendicular to the centerline 14. Both the height h and the width w can vary in dimension. When the first graphical icon 22 is a whitetail deer, the height h can range from between about 2.5 feet to about 4 feet, and the width can range from between about 3 feet to about 6 feet. It should be noted that the height h can equal the width w, if desired. For larger animals, the height h and width w can be larger and for smaller animals, the height h and the width w can be made smaller.

The animal crossing warning zone 20 also includes one or more sets of graphical icons 24. The color of each set of graphical icons 24 can vary. Desirably, each of the two graphical icons in each set 24 is of the same color. In addition, each set of graphical icons 24 can be the same color or be of a different color from the first graphical icon 22. Desirably, each of the sets of graphical icons 24 is white, yellow, orange, blaze orange or chartreuse in color. White and blaze orange are the most desirable colors.

The actual number of sets of graphical icons 24 that are utilized can vary. Most animal crossing warning zones 20 will employ two or more sets of graphical icons 24. Each set of graphical icons 24 is applied onto, into or extend outward from the upper surface 12 of the roadway 10 within the boundary or length of the animal crossing warning zone 20. The spacing or distance between each set of graphical icons 24, 24 can vary or be the same. For example, in an animal crossing warning zone 20 that extends over a distance of about one mile, each set of graphical icons 24 can appear every tenth of a mile starting from the first graphical icon 22. The actual number of sets of graphical icons 24 can vary depending on the overall length of the animal crossing warning zone 20, upon the curvature of the roadway 10 and upon the undulation of the roadway 10. For example, if the animal crossing warning zone 20 extends through an S-shaped curve, it may be prudent to locate the sets of graphical icons 24 closer together, as well as closer to the first graphical icon 22. Likewise, if the roadway 10 has continuous undulations, it may be prudent to position the sets of graphical icons 24 closer together, as well as closer to the first graphical icon 22. Desirably, each set of graphical icons 24 should be spaced an equal distance from an adjacent set of graphical icon 24. In addition, the set of graphical icons 24 located adjacent to the first graphical icon 22 should be spaced from the first graphical icon 22 at the same distance that it is spaced from the next set of graphical icons 24. In short, desirably, an equal spacing is present between the first graphical icon 22 and each adjacent set of graphical icons 24. However, the distance between adjacent sets of graphical icons 24 and the distance from the first graphical icon 22 can be different, if desired.

The distance between adjacent sets of graphical icons 24, 24 can range from at least about 100 feet to about 900 feet. Desirably, the distance will range from at least about 200 feet to about 800 feet. More desirably, the distance will range from at least about 300 feet to about 700 feet. Furthermore, each set of graphical icons 24 should not be positioned closer than about 100 feet from one another.

Each set of graphical icons 24 can be applied, painted, taped or sprayed onto the upper surface 12 of the roadway 10 and/or they can be formed partially or totally into the upper surface 12 as was explained above with reference to the first graphical icon 22. The first set of graphical icons 24 is located at a predetermined distance from the first graphical icon 22. Each subsequent set of graphical icons 24 is located at a predetermined distance from the adjacent or upstream set of graphical icons 24. This predetermined distance can vary or be the same.

Because of the uniformity of each set of back-to-back graphical icons 24, they will appear similar to all approaching motorist regardless of their direction of travel on the roadway 10.

Still referring to FIG. 1, each set of graphical icons 24 including a first icon 26 representing an animal running from right to left and right side up as viewed by an approaching motorist, driving in the right lane 16, and a second icon 28 representing an animal running from right to left and right side up as viewed by an approaching motorist driving in the left lane 18 for a two lane roadway 10. This pattern will alert an approaching motorist driving in either lane 16 or 18 that he or she is passing through the animal crossing warning zone 20. This is an important feature because the first and second icons, 26 and 28 respectively, are arranged and aligned back-to-back so that the icon closest to the approaching motorist is running away from him or her. The approaching motorist in the right lane 16 will also be able to see the second icon 28 but will quickly recognize that the whitetail deer is upside down. This will alert the approaching motorist in the right lane 16 that he or she is still passing through the animal crossing warning zone 20 and must be cautious. Likewise, the approaching motorist in the left lane 18 will also be able to see the first icon 26 but will quickly recognize that the whitetail deer is upside down. This will alert the approaching motorist in the left lane 18 that he or she is still passing through the animal crossing warning zone 20 and must be cautious.

The first and second icons, 26 and 28 respectively, should be situated within 3 feet of one another. Desirably, the first and second icons, 26 and 28 respectively, should be situated within 2 feet of one another. More desirably, the first and second icons, 26 and 28 respectively, should be situated within 1 foot of one another.

The animal crossing warning zone 20 further includes a second graphical icon 30 applied onto, into or extending out of the upper surface 12 of the roadway 10 at an opposite end of the animal crossing warning zone 20. The color of the second graphical icon 30 can vary. Desirably, the second graphical icon 30 is of the same color as the first graphical icon 22. In addition, the second graphical icon 30 can be the same or a different color from each set of graphical icons 24. Some good colors for the second graphical icon 30 include white, yellow, orange, blaze orange and chartreuse. White and blaze orange are the most desirable colors.

Within the animal crossing warning zone 20, the first graphical icon 22, the sets of graphical icons 24, and the second graphical icon 30 can be spaced a predetermined distance apart. This predetermined distance can vary. Desirably, this predetermined distance is at least about 100 feet. For an animal crossing warning zone 20 spanning at least 0.5 miles, at least three sets of the graphical icons 24 can be present. Each set of the graphical icons 24 can be spaced an equal distance apart and the first, second and third of the three sets of graphical icons 24 can be spaced at least about 100 feet from the first and second graphical icons, 22 and 30 respectively.

It should be noted that the first graphical icon 22, the one or more sets of graphical icons 24, and the second graphical icon 30 can all be of the same color. Desirably, white or blaze orange. Alternatively, the first and second graphical icons, 22 and 30 respectively, can be one color and the one or more sets of graphical icons 24 can be of a second or different color. For example, the first and second graphical icons, 22 and 30 respectively, can be blaze orange and the one or more sets of graphical icons 24 can be white.

It should also be recognized that the size and configuration of the first and second graphical icons, 22 and 30, as well as each of the sets of the graphical icons 24 can vary. All the icons 22, 24 and 30 can be of an identical shape and size. Alternatively, one or more of the icons 22, 24 and 30 can vary in shape and/or size from the remaining icons. For example, each of the first and second graphical icons, 22 and 30 respectively, can be of an identical size and configuration, and each set of graphical icons 24 can differ in size from the first and second graphical icons, 22 and 30 respectively.

The second graphical icon 30 can be aligned with the centerline 14, as shown, or it can be offset from the centerline 14. The second graphical icon 30 represents an animal (a deer) running from left to right and upside down as viewed by an approaching motorist driving in the right lane 16. The upside down silhouette alerts the approaching motorist in the right lane 16 that he or she is exiting the animal crossing warning zone 20. The second graphical icon 30 also represents an animal running from right to left and right side up as viewed by an approaching motorist driving in the left lane 18 whereby the approaching motorist in the left lane is alerted that he or she is entering an animal crossing warning zone 20 and should be cautious.

Still referring to FIG. 1, one will notice that an identification reference 31 consisting of: "ZONE 26", appears adjacent to or below the first and second graphical icons, 22 and 30 respectively, as viewed by an approaching motorist. The identification reference 31 faces towards the approaching motorist so that he or she can easily read it. The size, font, color and location of the identification reference 31 can vary. Any word(s) and/or number(s) can be utilized. The identification reference 31 can identify the actual animal crossing warning zone 20 in a particular county or state which is assigned by the Department of Transportation, by some other government agency, or by a local municipal body. Alternatively, the identification reference 31 can represent the actual road, roadway or highway route number which is recorded on state highway maps. When this is the case, if a motorist should have an accident with an animal, he or she will be able to quickly identify the roadway on which the accident occurred to the police and/or medical personnel. This is especially useful to visitors who do not customarily travel a particular roadway and may not be cognizant of the roadway number.

It should be noted that the identification reference 31 can consist of other word(s) and/or number(s). Instead of "ZONE 26", the identification reference 31 could consist of: "DEER CROSSING ZONE", "DEER CROSSING ZONE 26", "BEGIN DEER CROSSING ZONE" or any variation thereof, on the roadway 10. The identification reference 31 is present to make the motorist associate an animal crossing warning zone 20 with the same caution and respect that they apply while driving through a school zone. The animal crossing warning zone 20 must take on a special meaning to all motorists in the future.

It should also be understood that the first and second graphical icons 22 and 30 respectively, as well as the one or more sets of graphical icons 24, can contain or be associated with an alphanumeric reference, a number or a symbol designating a particular animal crossing warning zone 20. The alphanumeric reference, the number and/or the symbol can appear adjacent to, below, above or within the graphical icons 22, 24 or 30. The size, shape and color of each alphanumeric reference, each number and/or each symbol can also vary.

Referring now to FIG. 2, an alternative animal crossing warning zone 20' is shown. The animal crossing warning zone 20' differs from the animal crossing warning zone 20, shown in FIG. 1, in that the first and second graphical icons, 22' and 30' are different. The animal crossing warning zone 20' includes a first set of graphical icons 22' applied onto, into or which extend upward from the upper surface 12 of the roadway 10 at one end of the animal crossing warning zone 20'. The first set of graphical icons 22' can be aligned with the centerline 14. The first set of graphical icons 22' includes a first icon 32 and a second icon 34. The first icon 32 represents an animal running from right to left and right side up as viewed by an approaching motorist driving in the right lane 16 whereby the approaching motorist in the right lane 16 is alerted that he or she is entering an animal crossing warning zone 20'. The second icon 34 represents an animal running from right to left and right side up as viewed by an approaching motorist driving in the left lane 18 whereby the approaching motorist in the left lane 18 is alerted that he or she is exiting the animal crossing warning zone 20'.

The animal crossing warning zone 20' also includes one or more second sets of graphical icons 24 applied onto, into or which extend upward from the upper surface 12 of the roadway 10 within the overall length of the animal crossing warning zone 20'. Each of the second sets of graphical icons 24 can be aligned with the centerline 14 and is located at a predetermined distance from both the first and second sets of graphical icons, 22' and 30' respectively. Each of the second set of graphical icons 24 including a first icon 26 representing an animal running from right to left and right side up as viewed by an approaching motorist driving in the right lane 16, and a second icon 28 representing an animal running from right to left and right side up as viewed by an approaching motorist driving in the left lane 18 whereby an approaching motorist in either lane is alerted that he or she is passing through the animal crossing warning zone 20'.

The animal crossing warning zone 20' further includes a third set of graphical icons 30' applied onto, into or which extend upward from the upper surface 12 of the roadway 10 at an opposite end of the animal crossing warning zone 20'. The third set of graphical icons 30' can be aligned with the centerline 14. Desirably, the first, second and third sets of graphical icons, 22', 24 and 30' respectively, are aligned with the centerline 14. The third set of graphical icons 30' includes a first icon 36 representing an animal running from right to left and right side up as viewed by an approaching motorist driving in the right lane 16 whereby the approaching motorist in the right lane 16 is alerted that he or she is still within the animal crossing warning zone 20', and a second icon 38 representing an animal running from left to right and upside down as viewed by an approaching motorist driving in the right lane 16 whereby the approaching motorist in the right lane 16 is alerted that he or she is exiting the animal crossing warning zone 20'.

The animal crossing warning zone 20' also includes a first identification reference 37 applied in the right lane 16 before or in close proximity to the first set of graphical icons 22' and applied in the left lane 18 before the third set of graphical icons 30' to further alert a motorist that he or she is entering an animal crossing warning zone 20'. The first identification reference 37 includes the words "DEER CROSSING ZONE 26". Some other word(s) or number(s) could be substituted for the words: "DEER CROSSING ZONE 26", if desired. The first identification reference 37 can vary in size, font, color and location. Desirably, the first identification reference 37 is white, yellow or blaze orange in color. However, for easy recognition, the first identification reference 37 is shown being situated in the middle of each of the right and left lanes, 16 and 18 respectively.

A second identification reference 39 can be applied in the right lane 16 after or in close proximity to the third set of graphical icons 30' and in the left lane 18 after the first set of graphical icons 22' to further alert a motorist that he or she is exiting the animal crossing warning zone 20'. The second identification reference 39 consists of the word: "END". Some other word or words could be substituted for the word "END", if desired. The size, font, color and location of the second identification reference 39 can vary. However, for easy recognition, the second identification reference 39 is shown being situated in the middle of each of the right and left lanes, 16 and 18 respectively.

It should be noted that the size, shape, configuration and spacing of the graphical icons 22', 24 and 30' in FIG. 2 can be identical to one another or can vary as was explained above with reference to FIG. 1. Likewise, the color of the various graphical icons 22', 24 and 30' can be similar or different from one another as was explained above with reference to FIG. 1.

Referring now to FIG. 3, still another arrangement for an animal crossing warning zone 20" is shown. The animal crossing warning zone 20" differs from the arrangement of the animal crossing warning zone 20, shown in FIG. 1, in that the first graphical icon 22", the second graphical icon 30" and each of the sets of graphical icons 24" are of a larger size. In addition, the sets of graphical icons 24 and 24" are different. In FIG. 1, the first and second icons, 26 and 28 respectively, of each set of graphical icons 24, 24 are aligned back-to-back, while in FIG. 3, the first and second icons 26" and 28" of each set of graphical icons 24", 24" are aligned side-to-side. It should be noted that in each of the sets of graphical icons 24", the first icon 26" is located in the right lane 16 and the second icon 28" is located in the left lane 18. Neither is centered on the centerline 14 but the centerline 14 is equally spaced from each of the first and second icons, 26" and 28" respectively. One advantage to positioning the first and second icons, 26" and 28" respectively, in the right and left lanes, 16 and 18 respectively, is that they may be more visible.

Referring now to FIG. 3A, still another arrangement for an animal crossing warning zone 33 is shown wherein the roadway 10' represents four lanes. The four lanes include two right lanes 16', 16' and two left lanes 18', 18'. The animal crossing warning zone 33 includes a roadway 10' having an upper surface 12' with a centerline 14 dividing the two right lanes 16' and the two left lanes 18' in half. The animal crossing warning zone 33 includes a first graphical icon 23 applied to the upper surface 12' of the roadway 10' at one end of an animal crossing warning zone 33. The first graphical icon 23 represents an animal running from right to left and right side up as viewed by an approaching motorist driving in the right lane 16' whereby the approaching motorist in the right lane 16' is alerted that he or she is entering an animal crossing warning zone 33. The first graphical icon 23 also represents an animal running from right to left and right side up as viewed by an approaching motorist driving in the left lane 18' whereby the approaching motorist in the left lane 18' is alerted that he or she is entering an animal crossing warning zone 33.

The animal crossing warning zone 33 also includes a second graphical icon 25 applied to the upper surface 12' of the roadway 10' within the animal crossing warning zone 33. The second graphical icon 25 is located at a predetermined distance from the first graphical icon 23. The second graphical icon 25 representing an animal running from right to left and right side up as viewed by an approaching motorist driving in the right lane 16'.

The animal crossing warning zone 33 further includes a third graphical icon 27 applied to the upper surface 12' of the roadway 10' at an opposite end of the animal crossing warning zone 33. The third graphical icon 27 representing an animal running from left to right as viewed by an approaching motorist driving in the right lane 16'. The third graphical icon 27 also representing an animal running from right to left as viewed by an approaching motorist driving in the left lane 18'.

The first, second and third graphical icons, 23, 25 and 27 respectively, are all positioned on the centerlines 14, 14.

The animal crossing warning zone 33 also includes an identification reference 29 applied to the upper surface 12' of the roadway 10' along the centerline 14 of both the two right lanes 16', 16' and the two left lanes 18', 18'. The identification reference 29 will alert an approaching motorist in either of the two right lanes 16', 16' that he or she is exiting the animal crossing warning zone 33. The identification reference 29 will also alert an approaching motorist in either of the two left lanes 18', 18' that he or she is exiting the animal crossing warning zone 33. Furthermore, an identification reference 37, identical to that described in FIG. 2, can be applied to the upper surface 12' of the roadway 10' before or in close proximity to each of the first graphical icons 23, 23 whereby an approaching motorist in the two right lanes 16', 16' and in the two left lanes 18', 18' is alerted that he or she is entering the animal crossing warning zone 33.

Figure 3B:
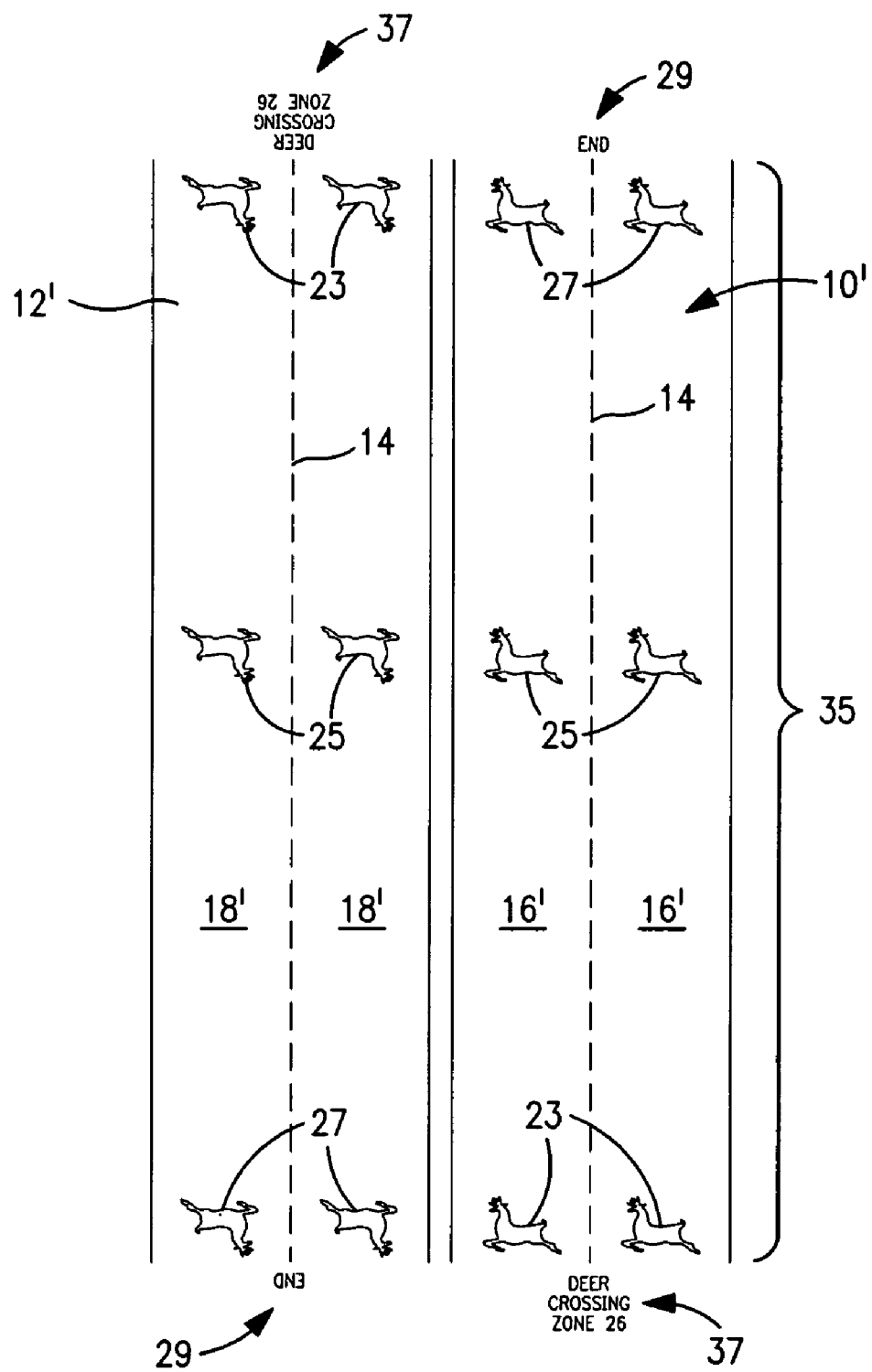
FIG. 3B is a top view of a four lane roadway having an animal crossing warning zone applied thereto which includes a pattern of graphical icons aligned within each lane.

Referring to FIG. 3B, still another arrangement for an animal crossing warning zone 35 is shown wherein the roadway 10' represents four lanes. The four lanes include two right lanes 16', 16' and two left lanes 18', 18'. The animal crossing warning zone 35 includes a roadway 10' having an upper surface 12' with a centerline 14 dividing the two right lanes 16', 16' and the two left lanes 18', 18' in half. The animal crossing warning zone 35 includes a pair of first graphical icons 23, 23 applied to the upper surface 12' of the roadway 10', in the two right lanes 16', 16', at one end of an animal crossing warning zone 35. The animal crossing warning zone 35 also includes a pair of first graphical icons 23, 23 applied to the upper surface 12' of the roadway 10', in the two left lanes 18', 18', at one end of an animal crossing warning zone 35. Two of the graphical icons 23, 23 are positioned in the center of each of the two right lanes 16', 16' and two of the graphical icons 23, 23 are positioned in the center of each of the two left lanes 18', 18'. Each of the first graphical icons 23, 23, in the two right lanes 16', 16' represents an animal running from right to left and right side up as viewed by an approaching motorist driving in either of the two right lanes 16', 16'. Each of the first graphical icons 23, 23, in the two left lanes 18', 18' represents an animal running from right to left and right side up as viewed by an approaching motorist driving in either of the two left lanes 18', 18' whereby the approaching motorist in either of the two right lanes 16', 16' or in either of the two left lanes 18', 18' is alerted that he is entering an animal crossing warning zone 35.

The animal crossing warning zone 35 also includes a second graphical icon 25 applied to the upper surface 12' of the roadway 10' in each of the two right lanes 16', 16' within the animal crossing warning zone 35. Each of the second graphical icons 25, 25 is located at a predetermined distance from one of the first graphical icons 23, 23. Each of the second graphical icons 25, 25 representing an animal running from right to left and right side up as viewed by an approaching motorist driving in either of the right lanes 16', 16'. A second graphical icon 25 is applied to the upper surface 12' of the roadway 10' in each of the two left lanes 18', 18' within the animal crossing warning zone 35. Each of the second graphical icons 25, 25 is located at a predetermined distance from one of the first graphical icons 23, 23. Each of the second graphical icons 25, 25 representing an animal running from right to left and right side up as viewed by an approaching motorist driving in either of the left lanes 18', 18'.

The animal crossing warning zone 35 further includes a third graphical icon 27 applied to the upper surface 12' of the roadway 10' in each of the two right lanes 16', 16' at an opposite end of the animal crossing warning zone 35. Each of the third graphical icons 27, 27 representing an animal running from left to right as viewed by an approaching motorist driving in either of the two right lanes 16', 16'. A third graphical icon 27 is applied to the upper surface 12' of the roadway 10' in each of the two left lanes 18', 18' within the animal crossing warning zone 35. Each of the third graphical icons 27, 27 is located at a predetermined distance from one of the second graphical icons 25, 25. Each of the third graphical icons 27, 27 representing an animal running from right to left and right side up as viewed by an approaching motorist driving in either of the left lanes 18', 18'.

The animal crossing warning zone 35 also includes an identification reference 29 applied to the upper surface 12' of the roadway 10' along the centerline 14 of the two right lanes 16', 16' whereby the approaching motorist in either of the right lanes 16', 16' is alerted that he is exiting the animal crossing warning zone 35. The identification reference 29 can also be applied to the upper surface 12' of the roadway 10' along the centerline 14 of the two left lanes 18', 18' whereby the approaching motorist in either of the left lanes 18', 18' is alerted that he is exiting the animal crossing warning zone 35. Furthermore, an identification reference 37, identical to that described in FIG. 2, can be applied to the upper surface 12' of the roadway 10' before or in close proximity to each of the first graphical icons 23, 23 whereby an approaching motorist in either of the two right lanes 16', 16' or in either of the two left lanes 18', 18' is alerted that he is entering the animal crossing warning zone 35.

Referring to FIG. 3C, still another arrangement for an animal crossing warning zone 41 is shown wherein the roadway 10' represents four lanes. The four lanes include two right lanes 16', 16' and two left lanes 18', 18'. The animal crossing warning zone 41 includes a roadway 10' having an upper surface 12' with a centerline 14 dividing the two right lanes 16', 16' and the two left lanes 18', 18' in half. The animal crossing warning zone 41 is similar to FIG. 3B except in the first, second and third graphical icons, 23' and 23', 25' and 25', and 27' and 27' respectively, the two whitetail deer are facing each other. In other words, one of the whitetail deer is running from right to left and the other whitetail deer is running left to right in the two right lanes 16', 16' and in the two left lanes 18', 18'.

Referring now to FIG. 4, still another arrangement for an animal crossing warning zone 21 is shown. The animal crossing warning zone 21 is similar to that depicted in FIG. 1 except that each of the first and second graphical icons, 22" and 30" respectively, are larger in size. In addition, each of the first and second graphical icons, 22" and 30" respectively, is larger in size than the first and second icons, 26 and 28 respectively, which make up each set of graphical icons 24. One advantage of this pattern is that the larger size graphical icon 22" is more visible to an approaching motorist in the right lane 16. Hopefully, this will cause the approaching motorist in the right lane 16 to be more cautious. Similarly, the larger size graphical icon 30" is more visible to the approaching motorist in the left lane 18. Hopefully, this will cause the approaching motorist in the left lane 18 to be more cautious. It is also felt by some that the larger size, upside down graphical icon 30" will also be more visible to the approaching motorist in the right lane 16 as he or she exits the animal crossing warning zone 21. This should clue the motorist that he or she is exiting the animal crossing warning zone 21 and the chance of striking a wild animal is reduced. This reasoning also applies to the larger size, upside down graphical icon 22" which is more visible to the approaching motorist in the left lane 18 as he or she exits the animal crossing warning zone 21.

It should be understood that a protective coating (not shown) can be optionally applied over the graphical icons 22, 22', 22", 23, 23', 24, 24", 25, 25', 26, 26", 27, 27', 28, 28", 30, 30', 30", 32, 34, 36 or 38 to extend their life. Various kinds of protective coatings are known to those skilled in the art. Desirably, the protective coating is transparent in color so as not to diminish the visibility of the graphical icons 22, 22', 22", 23, 23', 24, 24", 25, 25', 26, 26", 27, 27', 28, 28", 30, 30', 30"', 32, 34, 36 or 38.

Figure 5:
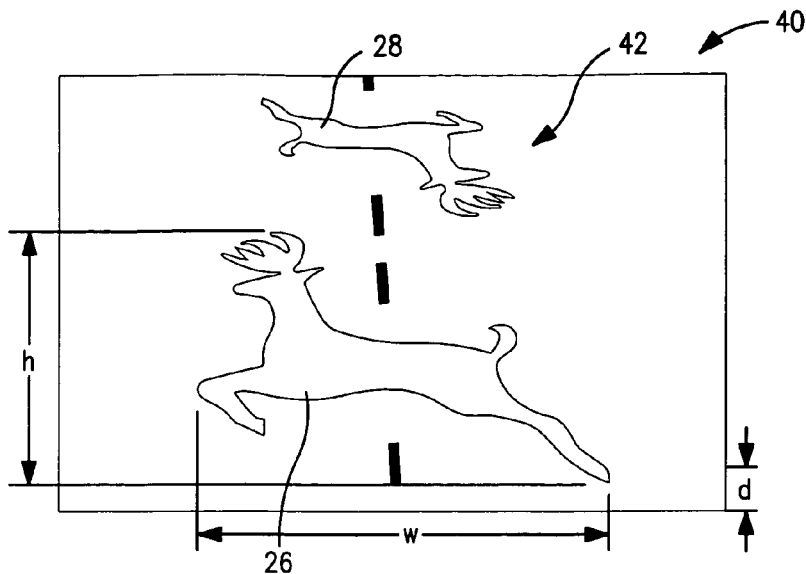
FIG. 5 is a top view of a set of back-to-back graphical icons depicting whitetail deer located within a designated area containing a reflective coating.

Referring now to FIG. 5, a top view of a set of graphical icons 26 and 28 are shown located within a designated area 40 which contains a reflective coating 42. The set of graphical icons 26 and 28 are aligned back-to-back. However, the set of graphical icons 26 and 28 could be aligned side-to-side, or in some other arrangement, if desired. The designated area 40 can vary in size and geometrical configuration. The designated area 40 can be shaped as a rectangle, a square, a circle, an oval or any other known geometrical shape. The designated area 40 should encompass the set of graphical icons 26 and 28 and extend outward from each of the graphical icons 26 and 28 by a distance d. The distance d can vary in dimension. Desirably, the distance d is at least about 6 inches, more desirably, at least about 1 foot, and even more desirably, at least about 2 feet from the profile of the graphical icons 26 and 28. A typical graphical icon 26 or 28, depicting a whitetail deer, can have a width w of from between about 3 feet to about 6 feet, and a height h of from between about 2.5 feet to about 4 feet. Therefore, the size of the designated area 40 for encompassing two graphical icons, 26 and 28, (whitetail deer), can range from about 5 feet to about 8 feet in width w, measured perpendicular to the centerline 14, and from about 4.5 feet to about 6 feet in height h, measured parallel to the centerline 14. It should be understood that the designated area 40 can be larger or smaller in size. The designated area 40 can also be made larger to accommodate two graphical icons of elk, moose or bison since these silhouettes may be larger in size. Likewise, the designated area 40 can be made smaller to accommodate two graphical icons of pronghorn, antelope and sheep since these silhouettes may be smaller in size.

The reflective coating 42 should differ in color from the graphical icons 22, 22', 22", 23, 23', 24, 24", 25, 25', 26, 26", 27, 27', 28, 28", 30, 30', 30", 32, 34, 36 or 38. Desirably, the reflective coating 42 will be of a contrasting color. The reflective coating 42 can be an outdoor reflective paint. Alternatively, the reflective coating 42 could be in the form of a reflective tape or reflective strips that are arranged about the exterior periphery of the graphical icons 26 and 28. The reflective coating 42, when in the form of paint, is applied to the upper surface 12 of the roadway 10 before the graphical icons 22, 22', 22", 24, 24", 25, 25', 26, 26", 27, 27', 28, 28", 30, 30', 30", 32, 34, 36 or 38. In the case where the reflective coating 42 is a reflective tape or strip, it can be applied before or after the graphical icons 26 and 28 are applied to the roadway 10. The reflective coating 42 can be painted, sprayed, brushed, rolled, stenciled or otherwise be applied to the roadway 10 by any means known to those skilled in the art. The reflective coating 42 can be constructed from a light-transmissive material so that as the beams of a vehicle's headlights shine upon it, it will illuminate the presence of the two graphical icons 26 and 28. The reflective coating 42 can also include glass beads or other granular material having prismatic surfaces that are capable of reflecting light. The reflective coating 42 can further contain iridescent or brilliantly colored material, again to reflect light. By constructing the reflective coating 42 from a color that contrasts with the color of the graphical icons 26 and 28, and by using pattern reflections and the like, one can make the graphical icons 26 and 28 more visible, especially during period of low light such as at dawn, at dusk and after sunset. Desirably, the reflective coating 42 is black in color. More desirably, the reflective coating 42 has a glossy appearance. Even more desirably, the reflective coating 42 has a smooth shiny surface.

The reflective coating 42 can also be constructed of a phosphorescent material or from a retro-reflective material. By a "phosphorescent material" it is meant a material which is capable of persistent emission of light following exposure to light. By "retro-reflective material" it is meant a first material situated behind a second material which causes the second material to be more reflective. Furthermore, the reflective coating 42 can be constructed using two or more layers of paint wherein the lower layer is of a solid color and the upper layer is transparent to produce a three-dimensional (3-D) image. It is also possible to construct the reflective coating 42 so that it produces a holographic image, to simulate depth of the graphical icons 26 and 28 or to provide the illusion of a three-dimensional (3-D) image to an approaching motorist. By "holography" it is meant a method of producing a three-dimensional (3-D) image of an object when the image is illuminated such as by the headlights of an approaching vehicle.

When the reflective coating 42 is an outdoor paint and after it has been applied directly to the upper surface 12 of the roadway 10 and has dried sufficiently, the first and second graphical icons 26 and 28 can be applied onto the reflective coating 42. The purpose of the reflective coating 42 is to increase the visibility of the first and second graphical icons, 26 and 28 respectively, or any of the other graphical icons 22, 22', 22", 23, 23', 24, 24", 25, 25', 26", 27, 27', 28", 30, 30', 30", 32, 34, 36 or 38, especially during times of low light.

Figure 6:
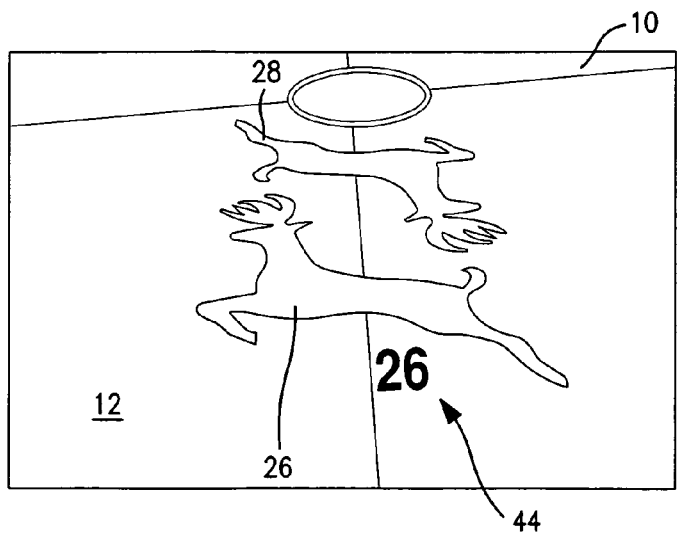
FIG. 6 is a top view of a set of back-to-back graphical icons depicting whitetail deer as well as a numeric reference.

Referring now to FIG. 6, a top view of a set of back-to-back graphical icons 26 and 28, depicting whitetail deer, are shown applied to the upper surface 12 of a roadway 10. An identification mark 44, depicted as "26", is also present. The identification mark 44 can be one or more numbers, letters, words, symbols or combination thereof. The identification mark 44 can be any desired number, letter, word or combination thereof, including a hyphen or other punctuation, if desired. The identification mark 44 can refer to or identify various things. For example, the identification mark 44 can identify the number assigned to a particular animal crossing warning zone 20 by a government department or agency, or by local government. The identification mark 44 can also be used to identify the route number of the roadway 10 as it appears on state maps. The identification mark 44 can assist a motorist who has struck an animal and needs to call for medical assistance or needs to notify the police. The identification mark 44 can be of the same color or be of a different color from the graphical icons 26 and 28. Desirably, the identification mark 44 is of the same color as the graphical icons 26 and 28. Likewise, the size, shape, font and location of the identification mark 44 can vary. For example, the identification mark 44 can be positioned within one of the graphical icons 26 or 28, if desired. The identification mark 44 should face towards the approaching motorist so that he or she can easily read or recognize it.

Figure 7:
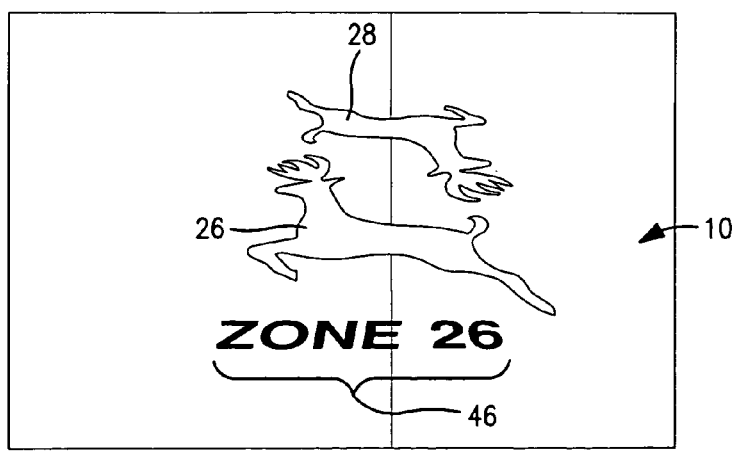
FIG. 7 is a top view of a set of back-to-back graphical icons, depicting whitetail deer, as well as a reference to a particular zone.

Referring now to FIG. 7, a top view of a set of graphical icons 26 and 28 are shown, of two whitetail deer, along with an alphanumeric identification mark 46. The alphanumeric identification mark 46 is depicted as: "ZONE 26". In this case, the alphanumeric identification mark 46 identifies the specific animal crossing warning zone number assigned by a local municipality or by a government department or agency. Some counties or states may require that the word "zone" along with a number or letter be painted or stenciled to the roadway 10 so as to act as an identification marker for record keeping purposes. This way, a state or county can keep track of how effective the animal crossing warning zone 20, 20', 20", 21, 21', 22, 22', 22", 23, 23', 25, 25', 26, 26", 27, 27', 28, 28", 30, 30', 30", 32, 33', 34, 35, 36, 38 and 41 is in preventing vehicle-animal accidents.

As discussed with reference to FIG. 6, the alphanumeric identification mark 46 can be of the same color or be of a different color from the graphical icons 26 and 28. Desirably, the alphanumeric identification mark 46 is of the same color as the graphical icons 26 and 28. Likewise, the size, shape, font and location of the alphanumeric identification mark 46 can vary. For example, the alphanumeric identification mark 46 can be positioned within one of the graphical icons 26 or 28, if desired. The alphanumeric identification mark 46 should face towards the approaching motorist so that he or she can easily read or recognize it.

Referring now to FIGS. 8-11, alternative animal crossing warning zones 43 and 45 are shown wherein a plurality of grooves 48 or 48' are formed in one or more of the first and second graphical icons, 22, 22" and 30, 30' and 30", as well as in one or more of the sets of graphical icons 24 or 24". The plurality of grooves 48 or 48' emits an audible sound and/or a vibration as a tire of a vehicle passes over them. The audible sound and/or vibration may or may not be noticeable to the motorist. Desirably, the audible sound and/or vibration are heard by the motorist. The audible sound and/or vibration will be detected or heard by a nearby animal. The audible sound may be a high frequency pitch which can be heard by a wild animal and cause it to run away. The sound waves or vibration created as a moving vehicle's tires passing over the plurality of grooves 48 or 48' will generate a low frequency alarm to nearby animals alerting them to stay away from the roadway 10. Thus, the motorist is provided with an increased level of protection from animals near the roadway 10 in a way that allows the motorist to concentrate on safe driving. The sound waves and/or vibration is temporarily generated in an effort to deter animals in the vicinity of the animal crossing warning zones 20, 20', 20", 21, 21', 22", 23, 23', 24, 24", 25, 25', 26, 26", 27, 27', 28, 28", 30, 30', 30", 32, 34, 35, 36, 38 and 41 from nearing or crossing the roadway 10.

Desirably, all of the grooves 48 or 48' are aligned parallel to one another within a specific graphical icon 22, 22", 24, 24", 30, 30' and 30". The plurality of grooves 48 or 48' can be aligned at an angle theta θ to the centerline 14. The angle θ can vary from 1 degree to 179 degrees relative to the centerline 14. Desirably, the angle θ is between about 15 degrees to about 165 degrees relative to the centerline 14. More desirably, the angle θ is between about 30 degrees to about 150 degrees relative to the centerline 14. Even more desirably, the angle θ is between about 40 degrees to about 140 degrees relative to the centerline 14.

The plurality of grooves 48 in one graphical icon 22, 22", 24, 24", 30, 30' and 30" can vary in shape, width, length, depth, angle of alignment relative to the centerline 14, as well as the spacing or distance between adjacent grooves 48 and 48, relative to another graphical icon 22, 22", 24, 24", 30, 30' and 30". In FIG. 8, the plurality of grooves 48 in each of the graphical icons 22, 26 and 28 are aligned at the same angle to the centerline 14. In FIG. 10, the plurality of grooves 48' formed in the first graphical icon 22 are aligned at a different angle to the centerline 14 than are the plurality of grooves 48 formed in the set of graphical icons 24.

The plurality of grooves 48 formed in each of the first icons 26 of the first, second and third sets of graphical icons 24 and the plurality of grooves 48 formed in each of the second icons 28 of the first, second and third sets of graphical icons 24, can be formed at a different depth. The utilization of different depths for different grooves 48 or 48' emits a different audible sound as a tire of a vehicle passes over them.

Referring to FIGS. 9 and 11, the number of actual grooves 48 present can vary as well as the spacing between adjacent grooves. In FIG. 9, each groove 48 is spaced a distance "a" apart from an adjacent groove 48. The distance "a" can be any desired distance. In FIG. 11, each groove 48' is spaced a distance "b" apart from an adjacent groove 48'. The distance "b" can be any desired distance but is less than the distance "a". A common distance "a" or "b" located between adjacent grooves 48 and 48 or 48' and 48' can range from between about 1 inch to several inches. Desirably, adjacent grooves 48 and 48 or 48' and 48' are at least about 2 inches apart. More desirably, adjacent grooves 48 and 48 or 48' and 48' are at least about 3 inches apart.

Each of the grooves 48 or 48' has a depth, $d_1$ and $d_2$ respectively. The depth of $d_1$ and $d_2$ can vary. In FIG. 9, the depth $d_1$ of the plurality of grooves 48 is at least about 0.25 inches. In FIG. 11, the depth $d_2$ of the plurality of grooves 48' is at least about 0.1 inches. Either depth $d_1$ or $d_2$ can range from between about 0.05 inches to about 1 inch. One or more of the plurality of grooves 48 formed in a given graphical icon 22, 22", 24, 24", 30, 30' and 30" can vary in depth. For example, all of the plurality of grooves 48 or 48', present in a given graphical icon 22, 22", 24, 24", 30, 30' and 30", can have the same depth $d_1$, as is shown in FIGS. 9 and 11. Alternatively, one or more of the plurality of grooves 48 or 48' in a given graphical icon 22, 22", 24, 24", 30, 30' and 30" can vary in depth. Furthermore, the depth $d_1$ or $d_2$ of each of the plurality of grooves 48 or 48' in one graphical icon 22, 22", 24, 24", 30, 30' and 30" can vary from the depth $d_1$ or $d_2$ of each of the plurality of grooves 48 or 48' in another graphical icon 22, 22", 24, 24", 30, 30' and 30".

FIGS. 9 and 11 also show a width for each of the grooves 48 and 48'. In FIG. 9, each groove 48 has a width $w_1$ and in FIG. 11, each of the grooves 48' has a width $w_2$. The dimensions of the widths $w_1$ and $w_2$ can vary. The dimension of the width $w_1$ can be less than, equal to or be greater than the dimension of the width $w_2$. A typical width can range from between about 0.1 inches to 1 inch.

Referring again to FIG. 10, one can see that that each of the plurality of grooves 48' formed in the first graphical icon 22 are at a different spacing and at a different angle relative to the centerline 14 than are the plurality of grooves 48 formed in the set of graphical icons 24. The plurality of grooves 48' can also be formed at a different depth $d_1$ than the depth $d_2$ which the plurality of grooves 48 are formed to. The different spacing, alignment, depth and width of the plurality of grooves 48 or 48' in a given graphical icon 22, 22", 24, 24", 30, 30' and 30" will cause a different audible sound to be emitted as a tire of a vehicle passes over them. This is an important feature because it is known that wild animals can become use to a given sound and its effectiveness quickly wears off. By constructing each graphical icon 22, 22", 24, 24", 30, 30' and 30" at a different angle to the centerline 14 or at a different spacing between adjacent grooves 48 and 48 or 48' and 48', or by constructing the plurality of grooves 48 or 48' to a different depth and width, one can change or mix up the sound and/or vibration that is generated as a vehicle's tire passes over it.

It should be understood that the plurality of grooves 48 or 48" could be replaced by a plurality of protuberances, bumps, humps, bulges, swellings, etc. (not shown) that extend upward or out of the upper surface 12 of the roadway 10. The arrangement of such a plurality of protuberances, bumps, humps, bulges, swellings, etc. can be similar or identical to the arrangement of the plurality of grooves 48 or 48' discussed above. One skilled in the art will know how to form such protuberances, bumps, humps, bulges, swellings, etc., as well as what equipment is necessary. The height, width and length of such protuberances, bumps, humps, bulges, swellings, etc. can vary. The height of such protuberances, bumps, humps, bulges, swellings, etc. can range from about 0.25 inches to about 3 inches or more. The width of such protuberances, bumps, humps, bulges, swellings, etc. can range from about 0.25 inches to about 6 inches or more. The length of such protuberances, bumps, humps, bulges, swellings, etc. can range from about a few inches to several feet.

Figure 12:
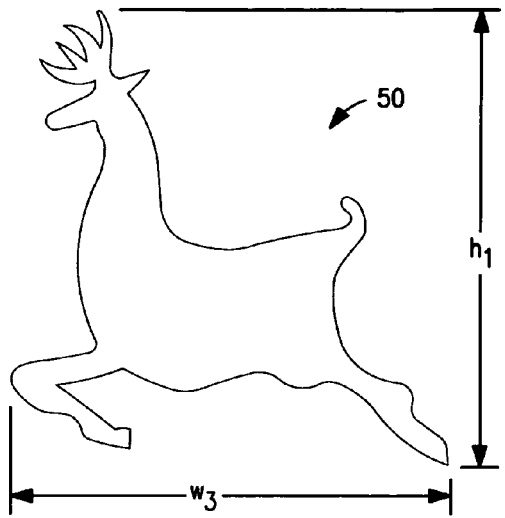
FIG. 12 is a top view of a graphical icon depicting a whitetail deer having a height dimension that is greater than its width dimension whereby the whitetail deer icon will closely resemble the size of a whitetail deer to an approaching motorist travelling at an accelerated speed.

Referring now to FIG. 12, another embodiment of a graphical icon 50 is shown which depicts a whitetail deer. The graphical icon 50 is different from previously described graphical icons 22, 22', 26, 26", 28, 28", 30, 30' and 30" in that it has a height dimension $h_1$ which is equal to or greater than its width dimension $w_3$. The height dimension $h_1$ is measured parallel to the centerline 14 while the width $w_3$ dimension is measured perpendicular to the centerline 14. By making the height dimension $h_1$ equal or greater than the width $w_3$ dimension, it is possible to cause the graphical icon 50 to closely resemble the size of a wild animal, in this case a whitetail deer, to an approaching motorist travelling at an accelerated speed. In other words, the silhouette of the animal in the graphical icon 50 can closely resemble the animal to a motorist who is speeding down the roadway 10. This feature will ensure that the motorist will be able to see and recognize the animal depicted in the graphical icon 50 well before he or she enters the animal crossing warning zone 20, 20' 20" or 21.

Figure 13:
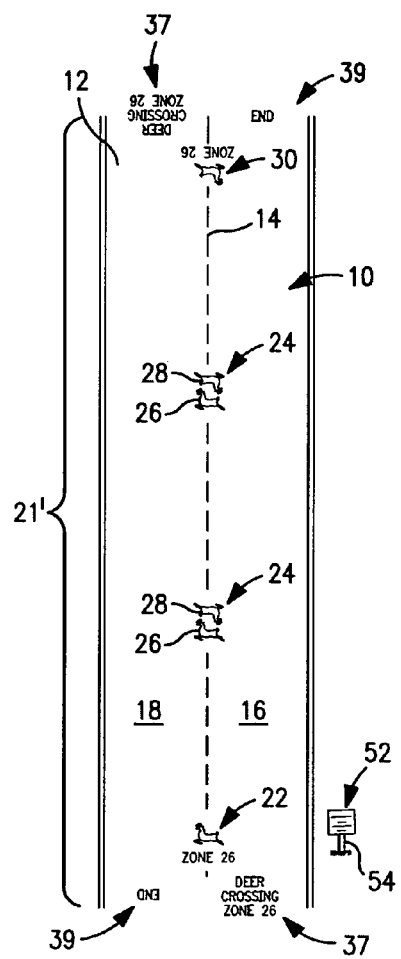
FIG. 13 is a top view of a roadway having an animal crossing warning zone applied thereto along with a roadside sign displaying a penalty maintenance fee.

Referring now to FIG. 13, a roadway 10 is shown having an animal crossing warning zone 21' applied thereto along with a roadside sign 52 displaying a penalty maintenance fee. The animal crossing warning zone 21' is similar to that shown in FIG. 1 except the identification reference 31, shown in FIG. 1, has been replaced by the first and second identification references, 37 and 39 respectively, shown in FIG. 2. In the right lane 16, the words: "DEER CROSSING ZONE 26" appear before the first graphical icon 22 to mark the start of the animal crossing warning zone 21', and the word: "END" appears after the second graphical icon 30 to mark the end of the animal crossing warning zone 21'. In the left lane 18, the words: "DEER CROSSING ZONE 26" appear before the second graphical icon 30 to mark the start of the animal crossing warning zone 21', and the word: "END" appears after the first graphical icon 22 to mark the end of the animal crossing warning zone 21'. The size, font, color and location of the first and second identification references, 37 and 39 respectively, can vary. However, for easy recognition, the first and second identification references, 37 and 39 respectively, are shown being situated in the middle of each of the right and left lanes, 16 and 18 respectively.

The roadside sign 52 is mounted on a vertical post 54 located on the right side of the roadway 10. The roadside sign 52 is situated adjacent to or in the vicinity of the first graphical icon 22 or 22". Alternatively, the roadside sign 52 is situated adjacent to or in the vicinity of the first set of graphical icons 22', when the animal crossing warning zone 20' utilizes the pattern shown in FIG. 2. The roadside sign 52 contains language alerting an approaching motorist that hitting or striking an animal within the animal crossing warning zone 21' may cause the motorist to be assessed a monetary fee. Any motorist that hits or strikes a wild animal within the animal crossing warning zone 20, 20', 20", 21 or 21' can be assessed a fee. The amount of the fee can vary. However, a steep fee, of say $500.00 will draw the attention of each motorist traveling through the animal crossing warning zone 20, 20', 20", 21 or 21' and cause them to slow down and be cautious. The roadside sign 52 could bear the following verbiage in a deer crossing warning zone:

"XXX Dollars Penalty Fee for Striking Deer Within Warning Zone"

For an animal crossing warning zone 20, 20' 20", 21 or 21' covering a distance of one mile, it will take a motorist, travelling at a speed of 60 mile per hour, one minute to pass through it. Driving through this same animal crossing warning zone 20, 20' 20", 21 or 21' at 30 mile per hour will take 2 minutes. Hence the motto: "Cost for hitting a deer $500, cost for not hitting a deer, 1 minute".

It should be noted that in an elk crossing warning zone, the word "elk" would replace the word "deer". Likewise in an antelope crossing zone, the word "antelope" would replace the word "deer".

The penalty maintenance fee may be assessed because a motorist hits a deer in the warning zone 21'. The threat of a penalty maintenance fee motivates the motorist to slow down so as to avoid hitting the deer in the first place. Now, rather than risk paying the $XXX fee, most motorists will slow down and take the extra time to drive through the animal crossing warning zone 20, 20' 20", 21 or 21'. The psychology of the penalty maintenance fee is that most motorist would rather slow down and take a little extra time in passing through the animal crossing warning zone 20, 20', 20" 21 or 21' then occur the risk of having to pay a steep fee. Furthermore, by driving at a slower speed, the motorist may possibly save his or her own life, the life of a passenger in his or her vehicle, as well as the life of the animal.

It is not contemplated that every motorist who hits or strikes a wild animal within the animal crossing warning zone 20, 20' 20", 21 or 21' will have to pay the penalty maintenance fee. The attending governing official, for example a police officer, who is called to the scene of the accident will determine with their discretion if the penalty maintenance fee is warranted, much like they use when assessing speeding tickets. The governing official will use three determining factors: first, the amount of damage caused to the vehicle from hitting the wild animal; second, the condition of the wild animal that was struck; and third, the attitude and disposition of the motorist, as well as any extenuating circumstances, such as vehicle brake failure, poor visibility, etc.

Every animal crossing warning zone 20, 20' 20", 21 or 21' is, at least in part, home to the wild animals. This is their domain, where they eat, sleep, roam, breed, reproduce, live and survive. They are going to cross roadways to get to food sources, bedding areas, to escape predators and/or to migrate. During the mating season, usually in the fall for many wild animals, the wild animals throw caution to the wind. The calendar period between October 15 and November 30 of every year represents the rut for whitetail deer. It is the responsibility of the motorist to use caution while travelling through such animal crossing warning zone 20, 20' 20", 21 or 21' during this calendar period.

The driving public must learn to slow down if we are to be successful in reducing vehicle-animal accidents. Reduced vehicle-animal accidents will occur when motorist are educated about the possible risks, when such risks are communicated to the general public, when applied psychology is utilized, when the subconscious motivation created by the "penalty maintenance fee" language on a roadside sign 52 is present, and when the conscious effect of a motorist is developed into a conditional reflex.

Method

Referring now to FIG. 14, a flow diagram depicts a method of applying the animal crossing warning zone 20, 20' 20", 21 or 21' to a roadway 10. The roadway 10 has an upper surface 12 with a centerline 14 that divides the roadway 10 into a right lane 16 and a left lane 18. The method includes the steps of cleaning at least first, second and third distinct and spaced apart designated areas 40 on the upper surface 12 of the roadway 10. The at least first, second and third designated areas 40 can be aligned with the centerline 14. The first designated area 40 is located at one end of the animal crossing warning zone 20, 20' 20", 21 or 21'; the second designated area 40 is located within the animal crossing warning zone 20, 20' 20", 21 or 21'; and the third designated area 40 is located at an opposite end of the animal crossing warning zone 20, 20' 20", 21 or 21' as viewed by an approaching motorist driving in the right lane 16.

The method also includes applying a first graphical icon 22 or 22", or a set of graphical icons 22', in the first designated area 40. The first graphical icon 22 or 22" represents an animal running from right to left and right side up as viewed by an approaching motorist driving in the right lane 16 whereby the approaching motorist in the right lane 16 is alerted that he or she is entering an animal crossing warning zone 20, 20' 20", 21 or 21'. The first graphical icon 22 or 22" also represents an animal running from right to left and upside down as viewed by an approaching motorist driving in the left lane 18 whereby the approaching motorist in the left lane 18 is alerted that he or she is exiting the animal crossing warning zone 20, 20' 20", 21 or 21'. The set of graphical icons 22' represent back-to-back icons 26 and 28 versus a single icon 22.

The method further includes applying a set of back-to-back graphical icons 24 in the second designated area 40. The set of back-to-back graphical icons 24 include a first icon 26 representing an animal running from right to left and right side up as viewed by an approaching motorist driving in the right lane 16, and a second icon 28 representing an animal running from right to left and right side up as viewed by an approaching motorist driving in the left lane 18 whereby an approaching motorist in either lane is alerted that he or she is passing through the animal crossing warning zone 20, 20' 20", 21 or 21'.

It should be noted that the set of icons 26" can be aligned side-to-side as is shown in FIG. 3 instead of back-to-back, if desired.

Lastly, the method includes applying a second graphical icon 30 or 30" in the third designated area 40. The second graphical icon 30 or 30" represents an animal running from left to right and upside down as viewed by an approaching motorist driving in the right lane 16 whereby the approaching motorist driving in the right lane 16 is alerted that he or she is exiting the animal crossing warning zone 20, 20' 20", 21 or 21'. The second graphical icon 30, 30' or 30" also represents an animal running from right to left and right side up as viewed by an approaching motorist driving in the left lane 18 whereby the approaching motorist driving in the left lane 18 is alerted that he or she is entering an animal crossing warning zone 20, 20' 20", 21 or 21'.

It should be noted that the second graphical icon 30 can be replaced with a set of graphical icons 30' as is shown in FIG. 2, if desired.

The method can also include the step of applying a reflective coating 42 onto the upper surface 12 of the roadway 10 in at least one of the first, second and third designated areas 40 prior to applying the first graphical icon 22 or 22", or a set of graphical icons 22', or a set of back-to-back graphical icons 24 or 24", or the third graphical icon 30 or 30", or a set of graphical icons 30'.

The method can further include the step of applying a protective coating over the first and second graphical icons, 22 or 22" and 30 or 30" respectively, or over the set of graphical icons 22' and 30', or over the set of back-to-back graphical icons 24 or 24". The protective coating should be transparent.

The method can also include the step of applying the set of back-to-back graphical icons 24 or 24" at a predetermined distance from the first graphical icon 22, 22' or 22". The predetermined distance should be at least about 100 feet. The method also includes applying another set of back-to-back graphical icons 24 or 24" thereafter at an identical predetermined distance, and then applying the third graphical icon 30, 30' or 30" at an identical predetermined distance from a last of the set of back-to-back graphical icons 24 or 24".

Lastly, the method can include the step of mounting a roadside sign 52 on a vertical post 54. The vertical post 54 is located on the right side of the roadway 10 and is situated adjacent to or in close proximity to the first graphical icon 22, 22' or 22". The roadside sign 52 contains "penalty maintenance fee" language alerting an approaching motorist that hitting an animal within the animal crossing warning zone 20, 20' 20", 21 or 21' may cause the motorist to be assessed a monetary fee.

While the invention has been described in conjunction with several specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. An animal crossing warning zone for a roadway having an upper surface with a centerline dividing said roadway into a right lane and a left lane, comprising:
    a) a first graphical icon applied to said upper surface of said roadway at one end of an animal crossing warning zone, said first graphical icon representing an animal running from right to left and right side up as viewed by an approaching motorist driving in said right lane whereby said approaching motorist in said right lane is alerted that he is entering an animal crossing warning zone, and said first graphical icon also representing an animal running from left to right and upside down as viewed by an approaching motorist driving in said left lane whereby said approaching motorist in said left lane is alerted that he is exiting an animal crossing warning zone;
    b) a set of graphical icons applied to said upper surface of said roadway within said animal crossing warning zone, said set of graphical icons being located at a predetermined distance from said first graphical icon, and said set of graphical icons including a first icon representing an animal running from right to left and right side up as viewed by an approaching motorist driving in said right lane, and a second icon representing an animal running from right to left and right side up as viewed by an approaching motorist driving in said left lane whereby an approaching motorist driving in either lane is alerted that he is passing through said animal crossing warning zone; and
    c) a second graphical icon applied to said upper surface of said roadway at an opposite end of said animal crossing warning zone, said second graphical icon representing an animal running from left to right and upside down as viewed by an approaching motorist driving in said right lane whereby said approaching motorist in said right lane is alerted that he is exiting said animal crossing warning zone, and said second graphical icon also representing an animal running from right to left and right side up as viewed by an approaching motorist driving in said left lane whereby said approaching motorist in said left lane is alerted that he is entering an animal crossing warning zone.

2. The animal crossing warning zone of claim 1 wherein said first and second icons in said set of graphical icons are aligned back-to-back and along said centerline, and said first and second graphical icons are of the same color and said set of graphical icons is of a different color.

3. The animal crossing warning zone of claim 2 wherein each of said first and second graphical icons and each icon within said set of graphical icons is of an identical size and configuration, and at least one of said first and second graphical icons is associated with an alphanumeric reference, a number or a symbol designating a particular animal crossing warning zone.

4. The animal crossing warning zone of claim 1 wherein each of said first and second graphical icons is of an identical size and configuration, and each of said first and second graphical icons differs in size from said icons within said set of graphical icons.

5. The animal crossing warning zone of claim 1 wherein said predetermined distance between said first graphical icon and said adjacent set of graphical icons is at least about 100 feet, at least three sets of said graphical icons are present within said animal crossing warning zone, each set is spaced an equal distance apart, and said last of said at least three sets of graphical icons is spaced at least about 100 feet from said second graphical icon.

6. The animal crossing warning zone of claim 1, wherein said first and second icons in said set of graphical icons are aligned side-to-side, and said first and second graphical icons are blaze orange in color and said set of graphical icons is white in color.

7. The animal crossing warning zone of claim 1, wherein at least one of said first and second graphical icons and said set of graphical icons has a plurality of groves formed therein, each of said plurality of grooves being aligned at an angle to said centerline and having a depth, and said plurality of grooves emitting an audible sound as a tire of a vehicle passes over them so as to alert a nearby animal of said approaching vehicle.

8. The animal crossing warning zone of claim 7 wherein a plurality of grooves are formed in said first graphical icon and a plurality of grooves are formed in said set of graphical icons, said plurality of grooves formed in said first graphical icon are formed at a different spacing and to a different depth than said plurality of grooves formed in said set of graphical icons, whereby said plurality of grooves formed in said first graphical icon emit a different audible sound than said plurality of grooves formed in said set of graphical icons as a tire of a vehicle passes over them.

9. The animal crossing warning zone of claim 1, wherein at least one of said first and second graphical icons and said set of graphical icons has a plurality of protuberances formed therein, each of said plurality of protuberances being aligned at an angle to said centerline and having a height, and said plurality of protuberances emitting an audible sound as a tire of a vehicle passes over them so as to alert a nearby animal of said approaching vehicle.

10. An animal crossing warning zone for a roadway having an upper surface with a centerline dividing said roadway into a right lane and a left lane, comprising:
    a) a first set of graphical icons applied to said upper surface of said roadway at one end of an animal crossing warning zone, said first set of graphical icons being aligned with said centerline, and said first set of graphical icons including a first icon representing an animal running from right to left and right side up as viewed by an approaching motorist driving in said right lane whereby said approaching motorist in said right lane is alerted that he is entering an animal crossing warning zone, and a second icon representing an animal running from right to left and right side up as viewed by an approaching motorist driving in said left lane whereby said approaching motorist in the left lane is alerted that he is exiting said animal crossing warning zone;
    b) a second set of graphical icons applied to said upper surface of said roadway within said animal crossing warning zone, said second set of graphical icons being aligned with said centerline and located at a predetermined distance from said first set of graphical icons, and said second set of graphical icons including a first icon representing an animal running from right to left and right side up as viewed by an approaching motorist driving in said right lane and a second icon representing an animal running from right to left and right side up as viewed by an approaching motorist driving in said left lane whereby an approaching motorist in either lane is alerted that he is passing through said animal crossing warning zone; and c) a third set of graphical icons applied to said upper surface of said roadway at an opposite end of said animal crossing warning zone along with a first identification reference applied in the right lane after said third set of graphical icons and applied in the left lane after said first set of graphical icons, said third set of graphical icons including a first icon representing an animal running from right to left and right side up as viewed by an approaching motorist driving in said right lane and a second icon representing an animal running from left to right and upside down as viewed by an approaching motorist driving in said right lane, whereby said approaching motorist in said right lane is alerted that he is exiting said animal crossing warning zone and said approaching motorist in said left lane is alerted that he is entering said animal crossing warning zone.

11. The animal crossing warning zone of claim 10 wherein each of said first and second icons of said first, second and third sets of graphical icons are aligned back-to-back and each has a height measured parallel to said centerline and a width measured perpendicular to said centerline, and said height dimension is greater than said width dimension whereby said first and second icons of said first, second and third sets of graphical icons will appear to resemble the actual size of an animal depicted by each of said first and second icons to an approaching motorist travelling at an accelerated speed.

12. The animal crossing warning zone of claim 10 wherein a plurality of grooves are formed in each of said first icons of said first, second and third sets of graphical icons and a plurality of grooves are formed in each of said second icons of said first, second and third sets of graphical icons, and said plurality of grooves formed in each of said first icons are formed at a different depth than said plurality of grooves formed in each of said second icons, whereby said plurality of grooves formed in each of said first icons emit a different audible sound than said plurality of grooves formed in each of said second icons as a tire of a vehicle passes over them.

13. The animal crossing warning zone of claim 12 wherein each of said plurality of grooves formed in each of said first icons is formed at a different spacing from said plurality of second grooves formed in each of said second icons, and each of said plurality of grooves has a depth of at least about 0.25 inches into said roadway.

14. The animal crossing warning zone of claim 10 further comprising a penalty maintenance fee sign mounted on a vertical post located on a right side of said roadway and situated adjacent to said first set of graphical icons, said penalty maintenance fee sign containing language alerting an approaching motorist that hitting an animal within said animal crossing warning zone may cause said motorist to be assessed a monetary fee.

15. The animal crossing warning zone of claim 14 wherein a plurality of protuberances are formed in each of said first icons of said first, second and third sets of graphical icons and a plurality of protuberances are formed in each of said second icons of said first, second and third sets of graphical icons, and said plurality of protuberances formed in each of said first icons are formed at a different depth than said plurality of protuberances formed in each of said second icons, whereby said plurality of protuberances formed in each of said first icons emit a different audible sound than said plurality of protuberances formed in each of said second icons as a tire of a vehicle passes over them.

16. A method of applying an animal crossing warning zone to a roadway having an upper surface with a centerline dividing said roadway into a right lane and a left lane, said method comprising the steps of:

a) cleaning at least first, second and third distinct and spaced apart designated areas on said upper surface of said roadway, said at least first, second and third designated areas being aligned with said centerline, and said first designated area being located at one end of said animal crossing warning zone, said second designated area being located within said animal crossing warning zone, and said third designated area being located at an opposite end of said animal crossing warning zone as viewed by an approaching motorist driving in said right lane;

b) applying a first graphical icon in said first designated area, said first graphical icon representing an animal running from right to left and right side up as viewed by an approaching motorist driving in said right lane whereby said approaching motorist in said right lane is alerted that he is entering an animal crossing warning zone, and said first graphical icon also representing an animal running from right to left and upside down as viewed by an approaching motorist driving in said left lane whereby said approaching motorist in said left lane is alerted that he is exiting said animal crossing warning zone;

c) applying a set of back-to-back graphical icons in said second designated area, said set of back-to-back graphical icons including a first icon representing an animal running from right to left and right side up as viewed by an approaching motorist driving in said right lane, and a second icon representing an animal running from right to left and right side up as viewed by an approaching motorist driving in said left lane whereby an approaching motorist in either lane is alerted that he is passing through said animal crossing warning zone; and d) applying a second graphical icon in said third designated area, said second graphical icon representing an animal running from left to right and upside down as viewed by an approaching motorist driving in said right lane whereby said approaching motorist driving in said right lane is alerted that he is exiting said animal crossing warning zone, and said second graphical icon also representing an animal running from right to left and right side up as viewed by an approaching motorist driving in said left lane whereby said approaching motorist driving in said left lane is alerted that he is entering an animal crossing warning zone.

17. The method of claim 16 further comprising the step of applying a reflective coating onto said upper surface of said roadway in at least one of said first, second and third designated areas prior to applying said first graphical icon, said set of back-to-back graphical icons and said third graphical icon.

18. The method of claim 16 further comprising the step of applying a protective coating over said first and second graphical icons and over said set of back-to-back graphical icons, and said protective coating is transparent.

19. The method of claim 16 further comprising the step of applying said set of back-to-back graphical icons at a predetermined distance from said first graphical icon, said predetermined distance being at least about 250 feet, applying another set of back-to-back graphical icons thereafter at an identical predetermined distance, and then applying said third graphical icon at an identical predetermined distance from a last of said set of back-to-back graphical icons.

20. The method of claim 16 further comprising the step of mounting a penalty maintenance fee sign on a vertical post, said vertical post being located on a right side of said roadway and situated adjacent to said first graphical icon, and said penalty maintenance fee sign containing language alerting an approaching motorist that hitting an animal within said animal crossing warning zone may cause said motorist to be assessed a monetary fee.

* * * * *

UNITED STATES PATENT AND TRADEMARK OFFICE
CERTIFICATE OF CORRECTION

PATENT NO.        : 8,142,100 B2                                             Page 1 of 1
APPLICATION NO.   : 12/804164
DATED             : March 27, 2012
INVENTOR(S)       : Harold Ralph Hanson It is certified that error appears in the above-identified patent and that said Letters Patent is hereby corrected as shown below:

In the Drawings, after page 7 of 7, please insert FIG. 14 as follows:

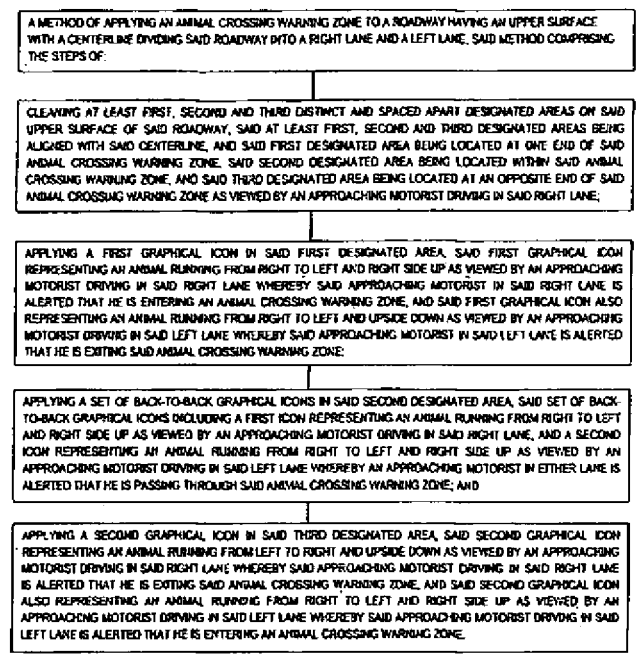

FIG. 14

In column 4, line 64, please insert --a-- between "for" and "motorist".

In column 6, line 30, please replace "indication" with --indicate--.

In column 6, line 40, please replace "medium" with --median--.

In column 6, line 67, please replace "signs" with --sign--.

In column 19, line 30, please replace "use to" with --used to--.

In column 19, line 67, please replace "travelling" with --traveling--.

Signed and Sealed this
Eleventh Day of September, 2012

David J. Kappos
*Director of the United States Patent and Trademark Office*